US012733000B2

(12) United States Patent
McHardy et al.

(10) Patent No.: US 12,733,000 B2
(45) Date of Patent: Sep. 8, 2026

(54) CONGESTION CONTROL BASED INTER-GNB CARRIER AGGREGATION

(71) Applicant: Telefonaktiebolaget LM Ericsson (publ), Stockholm (SE)

(72) Inventors: Geoffrey McHardy, Carp (CA); Samir Shah, Ottawa (CA); Jagadish Ghimire, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 670 days.

(21) Appl. No.: 18/030,924

(22) PCT Filed: Oct. 30, 2020

(86) PCT No.: PCT/IB2020/060236

§ 371 (c)(1),
(2) Date: Apr. 7, 2023

(87) PCT Pub. No.: WO2022/090783

PCT Pub. Date: May 5, 2022

(65) Prior Publication Data

US 2023/0370894 A1 Nov. 16, 2023

(51) Int. Cl.
*H04W 72/21* (2023.01)
*H04L 5/00* (2006.01)
(Continued)

(52) U.S. Cl.
CPC .......... *H04W 72/21* (2023.01); *H04L 5/0055* (2013.01); *H04W 28/0268* (2013.01);
(Continued)

(58) Field of Classification Search
CPC .... H04L 5/0055; H04L 5/0094; H04W 72/21; H04W 28/0268; H04W 28/0289;
(Continued)

(56) References Cited

U.S. PATENT DOCUMENTS

2007/0230493 A1* 10/2007 Dravida .............. H04L 49/9073 370/412
2009/0129265 A1 5/2009 Ye et al.
2020/0314816 A1* 10/2020 Yi ......................... H04L 5/0094

FOREIGN PATENT DOCUMENTS

WO 2020036928 A1 2/2020

OTHER PUBLICATIONS

International Search Report and Written Opinion of the International Searching Authority, PCT/IB2020/060236, mailed Sep. 22, 2021, 16 pages.

* cited by examiner

*Primary Examiner* — Khoa Huynh
(74) *Attorney, Agent, or Firm* — Sonoda & Kobayashi Intellectual Property Law; Sarvajit S. Patil

(57) ABSTRACT

A method, network node, computer program, and computer program product are provided. A number of media access control, MAC, flows from the first network node that each forms a source end-point to a destination end-point is defined, wherein the first network node includes the source end-point and each destination end point node includes a second network node having one or more destination carriers. A MAC flow packet size is defined that is scaled based on carrier bandwidth where each MAC flow packet has an approximately equivalent spectrum usage and an equivalent quality of service, QoS, on a destination carrier on the second network node. A MAC flow packet is transmitted to the second network node, wherein the MAC flow packet node includes a bundle of one or more MAC sub-protocol data units, sub-PDUs.

15 Claims, 19 Drawing Sheets

(51) Int. Cl.
*H04W 28/02* (2009.01)
*H04W 28/06* (2009.01)
*H04W 72/12* (2023.01)

(52) U.S. Cl.
CPC ....... *H04W 28/0289* (2013.01); *H04W 28/06* (2013.01); *H04W 72/12* (2013.01)

(58) Field of Classification Search
CPC ..... H04W 28/06; H04W 72/12; H04W 28/10; H04W 28/065
See application file for complete search history.

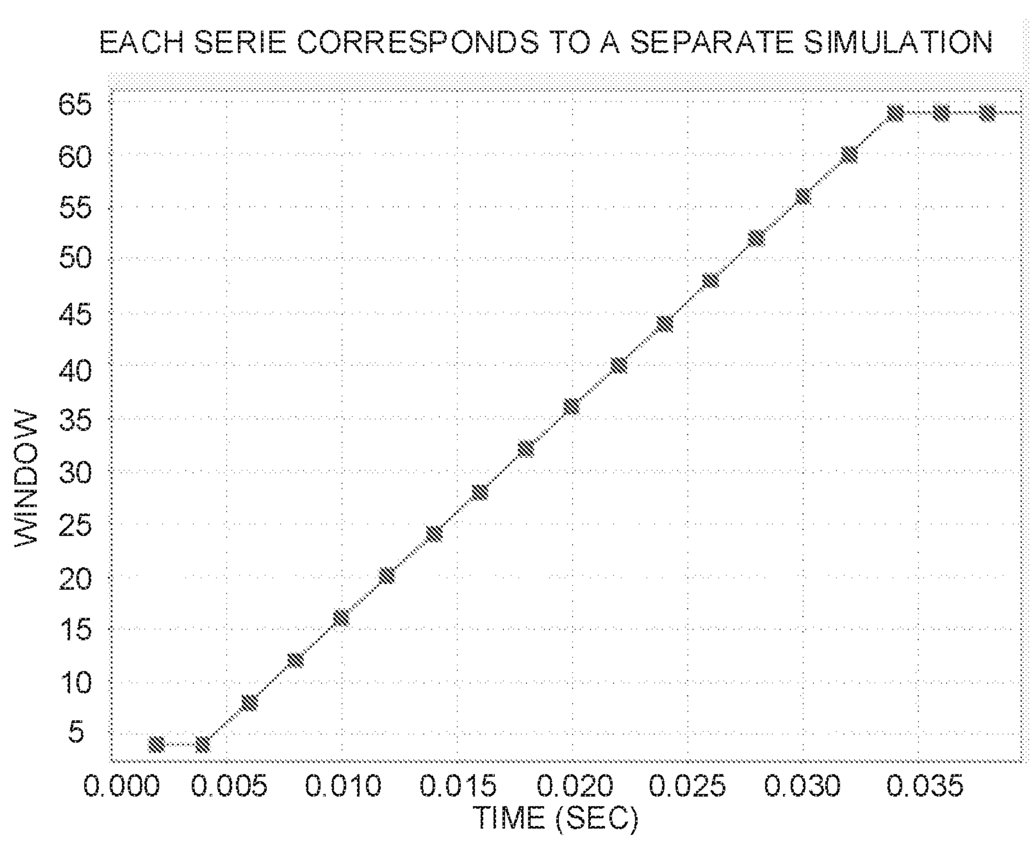
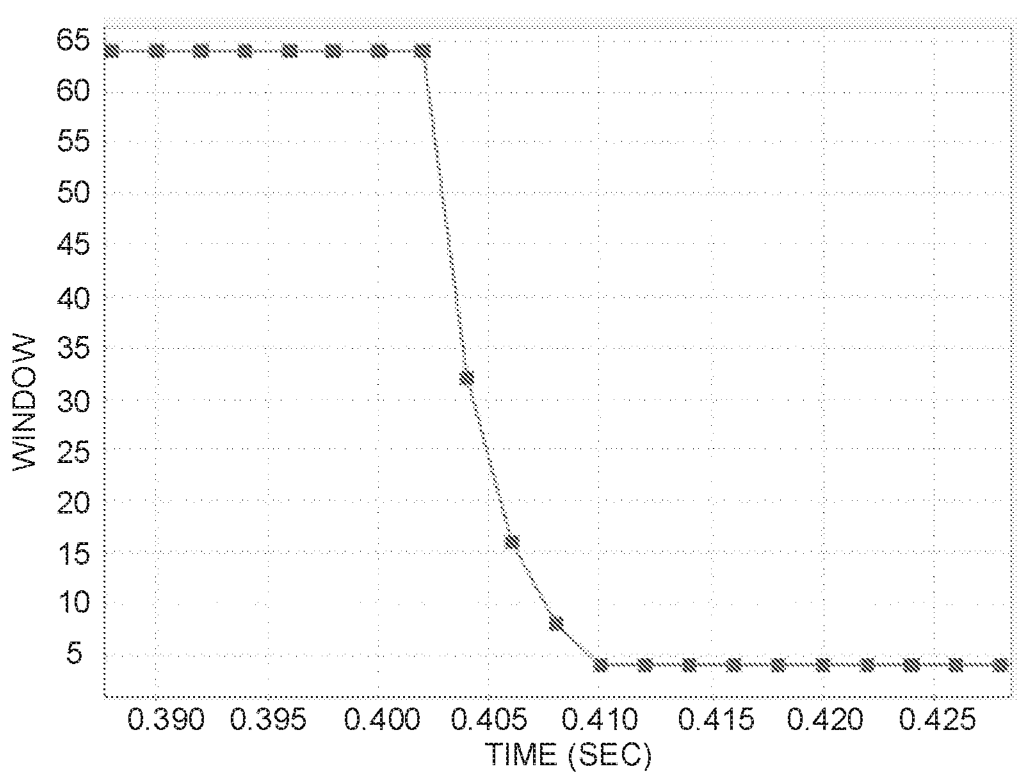
Figure 6

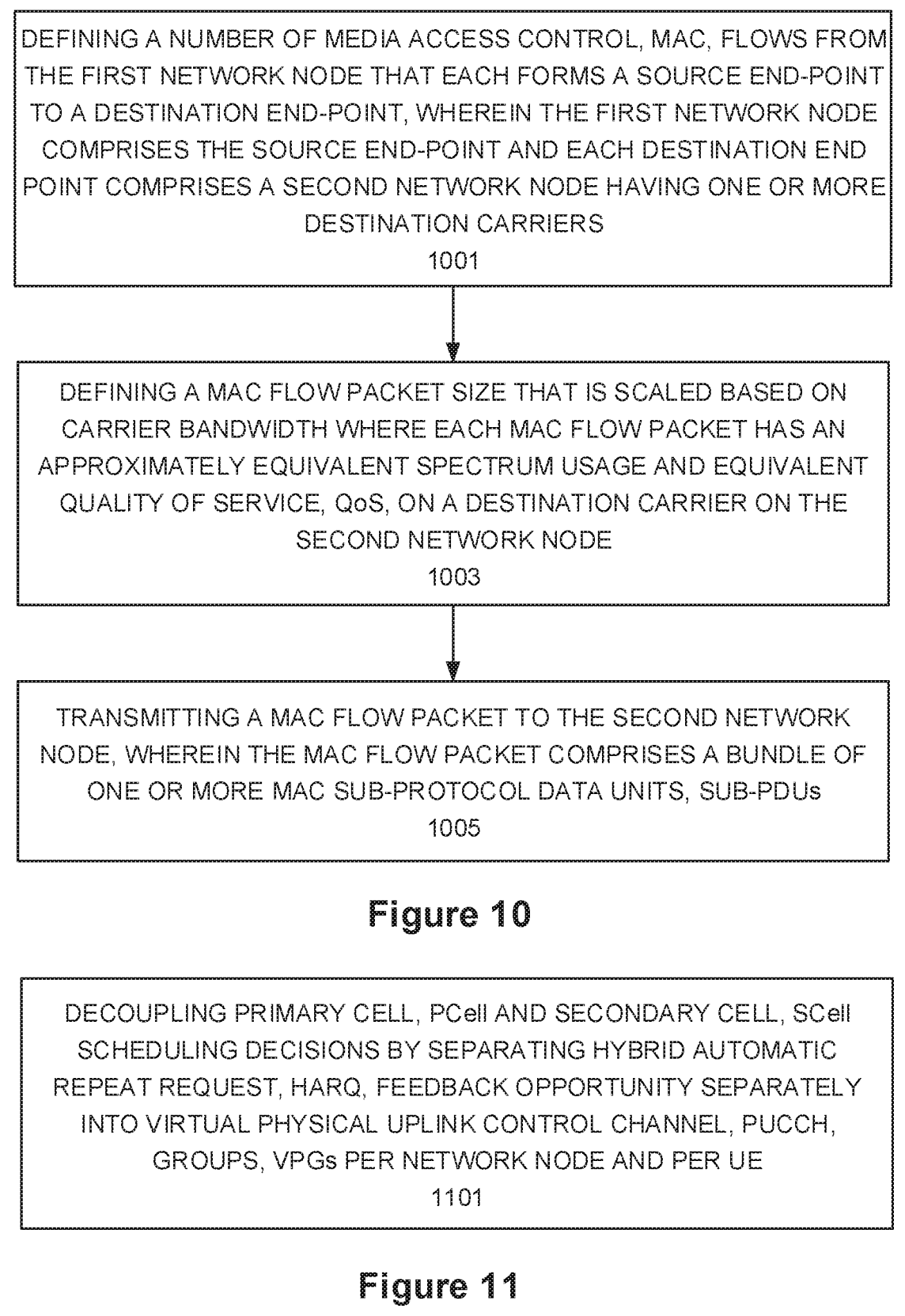

DEFINING A NUMBER OF MEDIA ACCESS CONTROL, MAC, FLOWS FROM THE FIRST NETWORK NODE THAT EACH FORMS A SOURCE END-POINT TO A DESTINATION END-POINT, WHEREIN THE FIRST NETWORK NODE COMPRISES THE SOURCE END-POINT AND EACH DESTINATION END POINT COMPRISES A SECOND NETWORK NODE HAVING ONE OR MORE DESTINATION CARRIERS
1001

DEFINING A MAC FLOW PACKET SIZE THAT IS SCALED BASED ON CARRIER BANDWIDTH WHERE EACH MAC FLOW PACKET HAS AN APPROXIMATELY EQUIVALENT SPECTRUM USAGE AND EQUIVALENT QUALITY OF SERVICE, QoS, ON A DESTINATION CARRIER ON THE SECOND NETWORK NODE
1003

TRANSMITTING A MAC FLOW PACKET TO THE SECOND NETWORK NODE, WHEREIN THE MAC FLOW PACKET COMPRISES A BUNDLE OF ONE OR MORE MAC SUB-PROTOCOL DATA UNITS, SUB-PDUs
1005

Figure 10

DECOUPLING PRIMARY CELL, PCell AND SECONDARY CELL, SCell SCHEDULING DECISIONS BY SEPARATING HYBRID AUTOMATIC REPEAT REQUEST, HARQ, FEEDBACK OPPORTUNITY SEPARATELY INTO VIRTUAL PHYSICAL UPLINK CONTROL CHANNEL, PUCCH, GROUPS, VPGs PER NETWORK NODE AND PER UE
1101

Figure 11

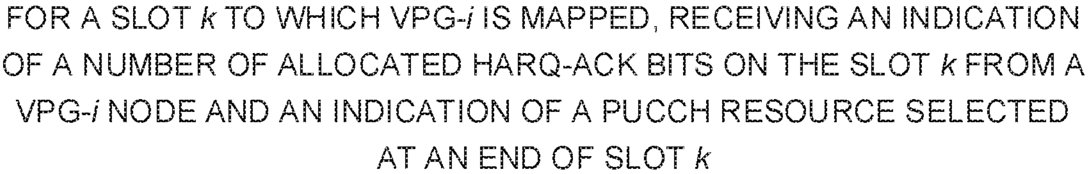

RESPONSIVE TO RECEIVING THE NUMBER OF ALLOCATED HARQ-ACK BITS, SETTING UP A PUCCH RECEIVER OR A PHYSICAL UPLINK SHARED CHANNEL, PUSCH, RECEIVER WITH A NUMBER OF EXPECTED UCI BITS FOR DECODING ALLOCATED RESOURCES ON THE PUCCH OR THE PUSCH
1403

Figure 14

RECEIVING, FROM THE ONE OR MORE FIRST NETWORK NODES, AN INDICATION OF MEDIA ACCESS CONTROL, MAC FLOW PACKETS COMPRISING MAC SUB-PROTOCOL DATA UNITS, PDUs, FROM EACH OF THE ONE OR MORE FIRST NETWORK NODES
1601

FOR EACH MAC FLOW OF ONE OR MORE MAC FLOWS, RECEIVING A QUALITY OF SERVICE, QoS, DEFINED FOR THE MAC FLOW
1603

BASED ON RECEIVING DATA IN ONE OR MORE MAC SUB-PDUs AND THE QoS DEFINED FOR THE ONE OR MORE MAC FLOWS, PRIORITIZING DATA TRAFFIC AMONGST THE ONE OR MORE MAC FLOWS AND TRAFFIC LOCAL TO THE SECOND NETWORK NODE
1605

Figure 16

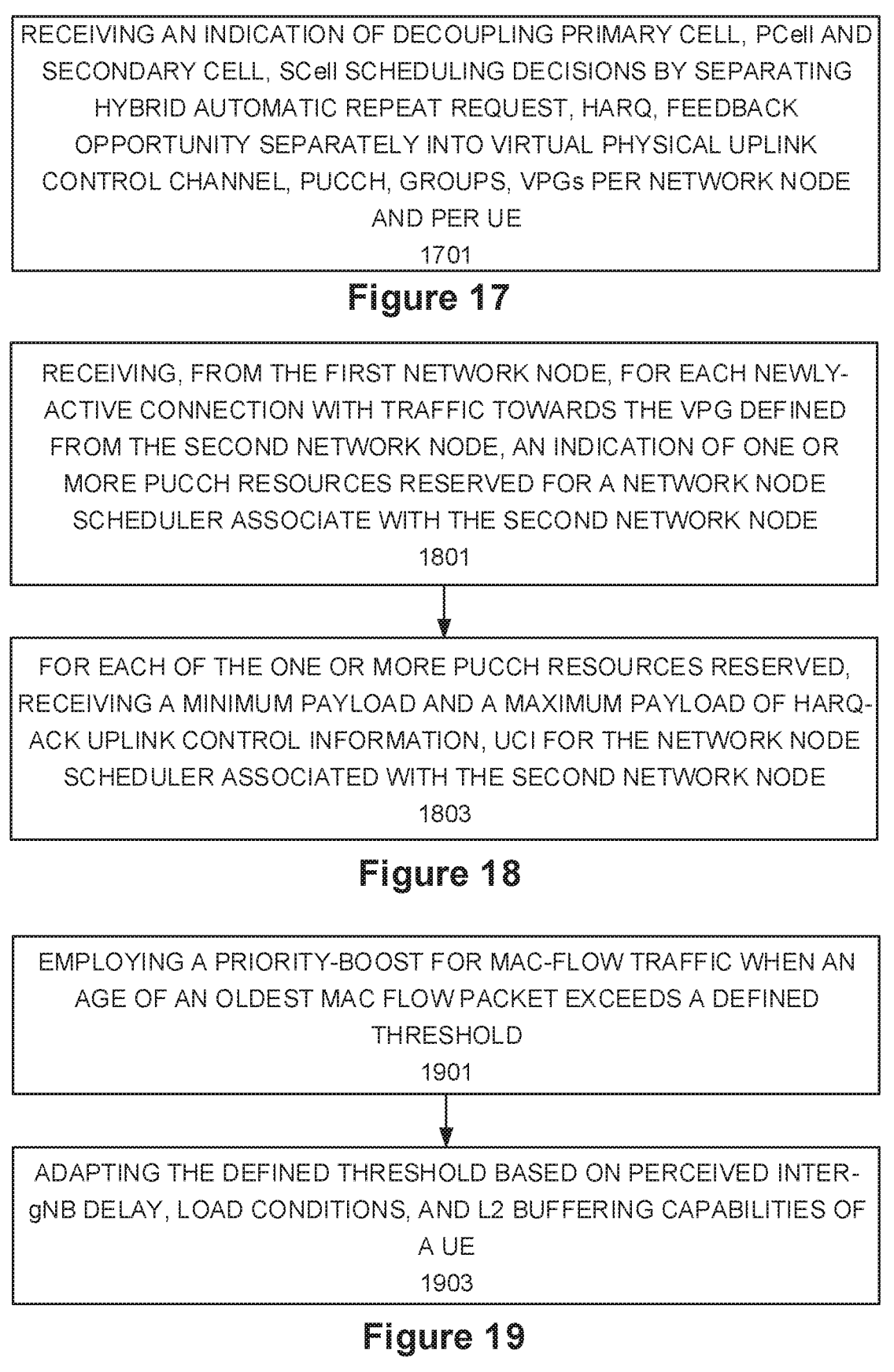

RECEIVING AN INDICATION OF DECOUPLING PRIMARY CELL, PCell AND SECONDARY CELL, SCell SCHEDULING DECISIONS BY SEPARATING HYBRID AUTOMATIC REPEAT REQUEST, HARQ, FEEDBACK OPPORTUNITY SEPARATELY INTO VIRTUAL PHYSICAL UPLINK CONTROL CHANNEL, PUCCH, GROUPS, VPGs PER NETWORK NODE AND PER UE
1701

Figure 17

RECEIVING, FROM THE FIRST NETWORK NODE, FOR EACH NEWLY-ACTIVE CONNECTION WITH TRAFFIC TOWARDS THE VPG DEFINED FROM THE SECOND NETWORK NODE, AN INDICATION OF ONE OR MORE PUCCH RESOURCES RESERVED FOR A NETWORK NODE SCHEDULER ASSOCIATE WITH THE SECOND NETWORK NODE
1801

FOR EACH OF THE ONE OR MORE PUCCH RESOURCES RESERVED, RECEIVING A MINIMUM PAYLOAD AND A MAXIMUM PAYLOAD OF HARQ-ACK UPLINK CONTROL INFORMATION, UCI FOR THE NETWORK NODE SCHEDULER ASSOCIATED WITH THE SECOND NETWORK NODE
1803

Figure 18

EMPLOYING A PRIORITY-BOOST FOR MAC-FLOW TRAFFIC WHEN AN AGE OF AN OLDEST MAC FLOW PACKET EXCEEDS A DEFINED THRESHOLD
1901

ADAPTING THE DEFINED THRESHOLD BASED ON PERCEIVED INTER-gNB DELAY, LOAD CONDITIONS, AND L2 BUFFERING CAPABILITIES OF A UE
1903

Figure 19

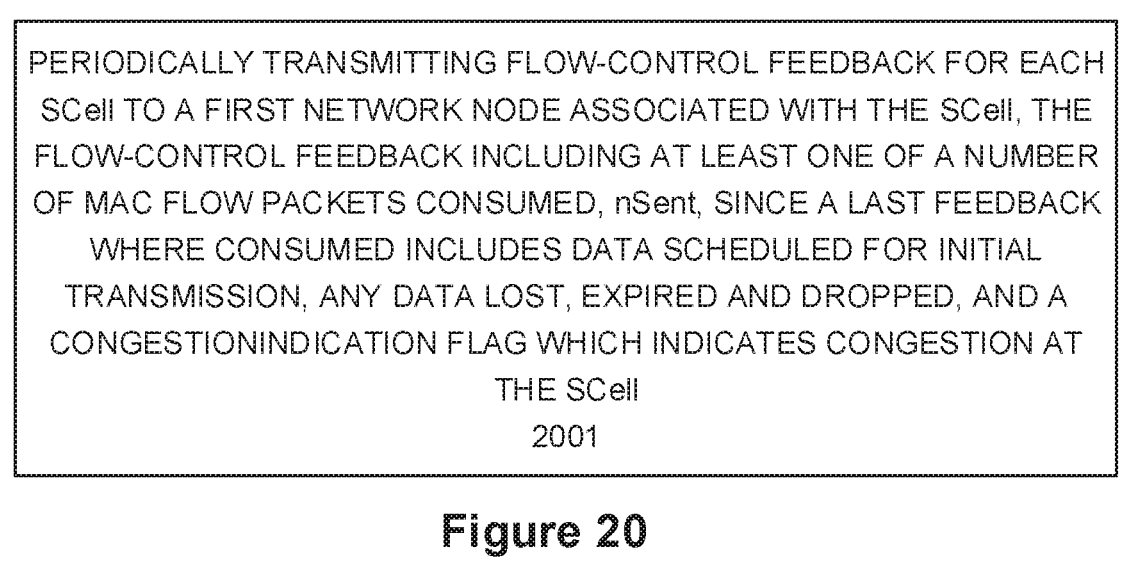

PERIODICALLY TRANSMITTING FLOW-CONTROL FEEDBACK FOR EACH SCell TO A FIRST NETWORK NODE ASSOCIATED WITH THE SCell, THE FLOW-CONTROL FEEDBACK INCLUDING AT LEAST ONE OF A NUMBER OF MAC FLOW PACKETS CONSUMED, nSent, SINCE A LAST FEEDBACK WHERE CONSUMED INCLUDES DATA SCHEDULED FOR INITIAL TRANSMISSION, ANY DATA LOST, EXPIRED AND DROPPED, AND A CONGESTIONINDICATION FLAG WHICH INDICATES CONGESTION AT THE SCell
2001

Figure 20

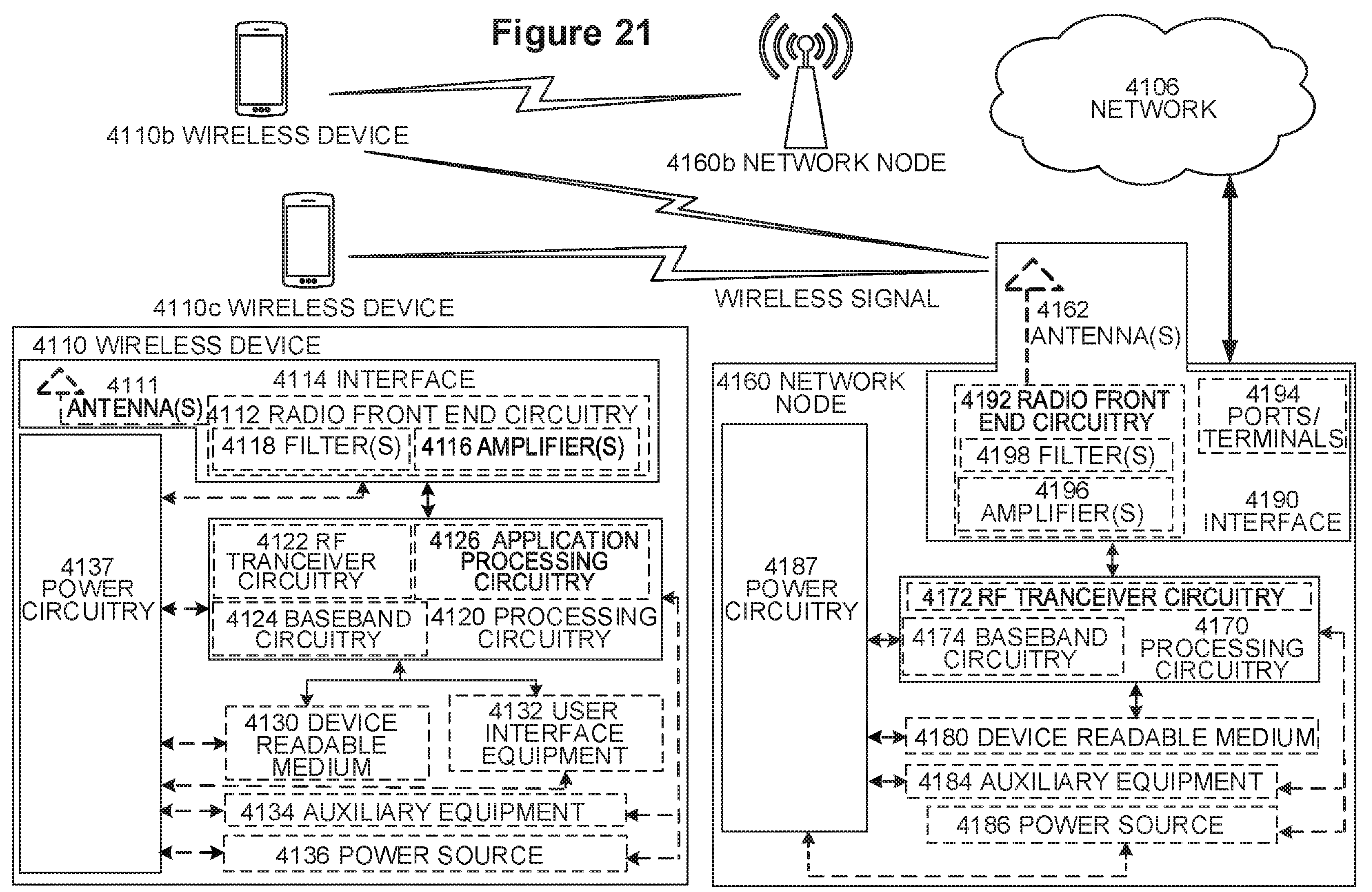
Figure 21
4110b WIRELESS DEVICE
4160b NETWORK NODE
4106 NETWORK
4110c WIRELESS DEVICE
WIRELESS SIGNAL
4162 ANTENNA(S)
4110 WIRELESS DEVICE
4111 ANTENNA(S)
4114 INTERFACE
4112 RADIO FRONT END CIRCUITRY
4118 FILTER(S)
4116 AMPLIFIER(S)
4137 POWER CIRCUITRY
4122 RF TRANCEIVER CIRCUITRY
4126 APPLICATION PROCESSING CIRCUITRY
4124 BASEBAND CIRCUITRY
4120 PROCESSING CIRCUITRY
4130 DEVICE READABLE MEDIUM
4132 USER INTERFACE EQUIPMENT
4134 AUXILIARY EQUIPMENT
4136 POWER SOURCE
4160 NETWORK NODE
4192 RADIO FRONT END CIRCUITRY
4198 FILTER(S)
4196 AMPLIFIER(S)
4194 PORTS/ TERMINALS
4190 INTERFACE
4187 POWER CIRCUITRY
4172 RF TRANCEIVER CIRCUITRY
4174 BASEBAND CIRCUITRY
4170 PROCESSING CIRCUITRY
4180 DEVICE READABLE MEDIUM
4184 AUXILIARY EQUIPMENT
4186 POWER SOURCE

CONGESTION CONTROL BASED INTER-GNB CARRIER AGGREGATION

CROSS REFERENCE TO RELATED APPLICATIONS

This application is a 35 U.S.C. § 371 national stage application of PCT International Application No. PCT/IB2020/060236 filed on Oct. 30, 2020, the disclosure and content of which is incorporated by reference herein in its entirety.

TECHNICAL FIELD

The present disclosure relates generally to communications, and more particularly to communication methods and related devices and nodes supporting wireless communications.

BACKGROUND

Modern multi-carrier/multi-band wireless networks provide mechanisms and protocol-support to allow a UE to receive/transmit data on multiple carriers simultaneously. This leads to larger aggregate bandwidth and thus better performance In the context of 3GPP LTE (Long Term Evolution) and NR (New Radio) technology, two main aggregation methods have been standardized. These are dual connectivity and carrier aggregation.

Dual connectivity (DC) realizes the aggregation by allowing the PDCP (packet data convergence protocol) layer to exploit data transfer service from up to two RLC (radio link control) channels, each mapped to one CellGroup, commonly referred to as "legs". Under DC operation, the two lower-layer RLC-MAC-PHY (RLC Media Access Control-Physical) stacks are more or less independent with self-contained logical channel and physical channel mappings for data transfer service as well as L1/L2 control procedures. This implies that each leg should contain all the required DL (downlink) and UL (uplink) physical channels. Typically, at least one serving cell in each leg has to be a cell with both DL and UL, referred to as SpCell in 3GPP terminology.

Carrier Aggregation is a technique whereby aggregation is done at the MAC (medium access control) layer. This is an extension of the logical channel multiplexing service where MAC takes the incoming RLC data from multiple logical channels and multiplexes them into MAC PDUs (protocol data units) and is then dynamically sent towards one of the serving cells.

A MAC PDU consists of one or multiple MAC sub-PDUs where each sub-PDU is a either MAC sub-PDU header appended RLC data (RLC PDU or RLC segment, or RLC status PDU) from one of the logical channels or is a MAC level control message. The MAC PDUs are sent over the transport channels (DL-SCH (downlink-shared channel) and UL-SCH) each mapped to a different serving cell. The physical layer (PHY) takes up these MAC PDUs as Transport-Blocks (TBs) and maps them to physical channels (shared channel PDSCH/PUSCH, as well as the required control channels PDCCH/PUCCH). Retransmissions for HARQ (hybrid automatic repeat request) are managed at the MAC layer independently per serving cell while the PHY layer handles HARQ-combining.

Unlike dual connectivity, carrier aggregation allows the serving cells being aggregated to only be configured for DL. In that case, any UL physical channel needed (either for DL data transfer in the DL-only cells, or UL-SCH transmission or a UCI-only transmission) is transmitted on the SpCell. Non-SpCells are called the Secondary Cells (SCells). The case where SCells have DL channels only is referred to as Downlink Carrier Aggregation.

For the case of a pure downlink carrier aggregation and without cross-carrier scheduling, DL-SCH in one component carrier is mapped to the PDCCH (physical downlink control channel) and PDSCH (physical downlink shared channel) in that particular serving cell whereas PUCCH (physical uplink control channel) for HARQ-ACK feedback is mapped to the SpCell.

A scheduling entity typically handles the MAC layer operations including Transport Format Selection for DL-SCH/UL-SCH as well as generation of DCI (downlink control information). This in turn influences the allocation of physical channels (PDCCH, PDSCH and PUCCH in the case of DL-SCH scheduling, and PDCCH and PUSCH in the case of UL-SCH scheduling).

One important difference between dual connectivity and carrier aggregation is that in dual connectivity, it is typical to have different schedulers control their own cells in a rather decoupled way. Carrier aggregation, on the other hand, is built with an assumption (even though not mandated or specified) that a centralized scheduler controls scheduling decision across the serving cells. This makes the DCI/UCI data over physical channels in one carrier to be dependent on scheduling decisions on other carriers. There are also constraints on the validity of DL physical channel allocations on one serving cell based on UL physical channel allocations in another serving cell, and vice-versa. UE's C-DRX (connected mode discontinuous reception) state is also shared across serving cells and is influenced by physical channel allocation decisions on all the serving cells.

SUMMARY

NR can operate over a large range of frequency bands with very different propagation characteristics. Performing CA between a high-bandwidth/high-frequency carrier with a low-bandwidth/low-frequency carrier is expected to provide network capacity gains by enabling either a higher net bandwidth or by enabling use of DL of the high-frequency beyond the point of UL coverage loss by "moving" the UL channels to the low-frequency carrier. This opportunity however comes with a set of challenges:

- Non-collocated nodes: It is typical that the high-frequency carriers will be hosted in different nodes than the low-frequency carriers, as the former are expected to have smaller coverage foot-print and thus scale well if are packaged in their own controlling nodes.
- Large Inter-node delay: The fact that the high-frequency hot-spots will be numerous often leads to less than ideal inter-connect towards nodes controlling the low-frequency cells, primarily due to the constraints on CAPEX/OPEX (capital expenditures/operating expenses).
- Numerology difference: It is typical that the high-frequency carrier will have a larger numerology than the low-frequency carrier.
- Mesh Relationship between carriers: A carrier used as a PCELL can make use of multiple secondary carriers which may be local to the gNB or managed externally by multiple partner nodes. Similarly, a carrier can be simultaneously used to carry local traffic or SCELL traffic from multiple local or external gNB.

Current carrier aggregation techniques rely on either tightly coupled slot-level coordination between nodes or relies on load prediction pre-reservation of air interface resources, both of which have significant disadvantages. Slot level control requires inter-node communication delays which are a small fraction of a slot, which is often impossible in many network deployments and with NR is made worse due to the shorter slot numerologies. Prediction of future slot-level demand is also extremely difficult and often leads to inefficiency and inflexibility for the scheduler making it slower to react to new data arrival at the gNB and reduces quality of service handling accuracy. These problems are exaggerated for deployments where there are multiple external partner nodes wishing to share resources on a single carrier.

Various embodiments of inventive concepts decouple the PCELL and SCELL scheduling decision by using either semi-static HARQ codebook or by separating HARQ feedback opportunity separately into virtual PUCCH groups per gNB. Multiple flows from multiple partners are managed through a congestion control algorithm. The PCELL gNB builds sub-PDU MAC segments which are scaled as a fixed percent of channel bandwidth. The SCELL node can combine or send individually and the drain rate of these segments is managed through the congestion algorithm. These sub flows can be grouped into similar QoS groups so that the segment drain rate can be treated fairly across different queues. The queue size can adjust very quickly due to fast feedback which allows efficient and fast reaction to changing data demand from either local or external queues.

According to some embodiments of inventive concepts, a method performed by a first network node having one or more carriers in a network is provided. The method includes defining a number of media access control, MAC, flows from the first network node that each forms a source end-point to a destination end-point, wherein the first network node comprises the source end-point and each destination end point comprises a second network node having one or more destination carriers. The method further includes defining a MAC flow packet size that is scaled based on carrier bandwidth where each MAC flow packet has an approximately equivalent spectrum usage and an equivalent quality of service, QoS, on a destination carrier on the second network node. The method further includes transmitting a MAC flow packet to the second network node, wherein the MAC flow packet comprises a bundle of one or more MAC sub-protocol data units, sub-PDUs.

Analogous network nodes, computer programs and computer program products are also provided.

According to other embodiments of inventive concepts, a method performed by a second network node having one or more carriers in a network is provided. The method includes receiving, from the one or more first network nodes, an indication of Media Access Control, MAC flow packets comprising MAC sub-protocol data units, PDUs, from each of the one or more first network nodes. The method further includes for each MAC flow, receiving a quality of service, QoS, defined for the MAC flow. The method further includes based on receiving data in one or more MAC sub-PDUs and the QoS defined for one or more MAC flows, prioritizing data traffic amongst each of the one or more MAC flows and traffic local to the second network node.

Analogous network nodes, computer programs and computer program products are also provided.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 6 is an illustration of window increments during ACTIVE state and window decrements during CONGESTION state according to some embodiments;

FIGS. 10-15 are flow charts illustrating operations of a first network node according to some embodiments of inventive concepts;

FIGS. 16-20 are flow charts illustrating operations of a second network node according to some embodiments of inventive concepts;

FIG. 21 is a block diagram of a wireless network in accordance with some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 7:
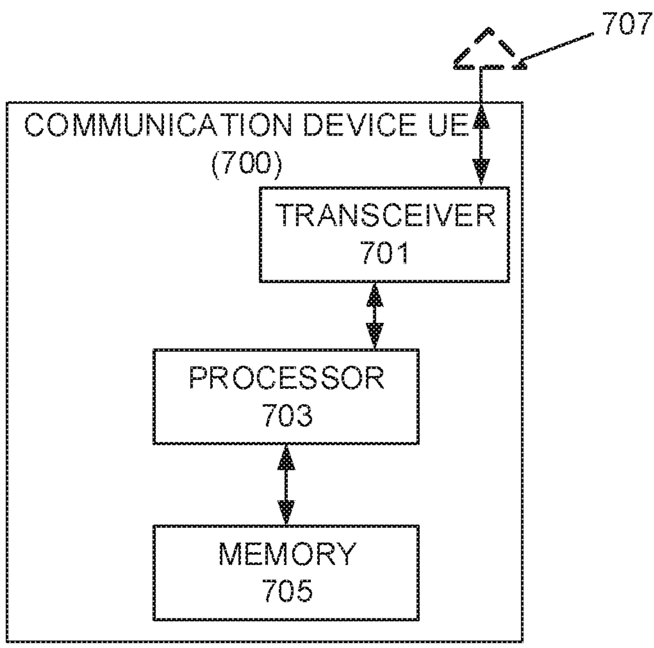
FIG. 7 is a block diagram illustrating a UE communication device according to some embodiments of inventive concepts.

FIG. 7 is a block diagram illustrating elements of a communication device 700 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 700 may be provided, for example, as discussed below with respect to wireless device 4110 of FIG. 21, UE 4200 of FIG. 22, UEs 4491, 4492 of FIG. 24, and UE 4530 of FIG. 25, all of which should be considered interchangeable in the examples and embodiments described herein and be within the intended scope of this disclosure, unless otherwise noted.) As shown, communication device 700 may include an antenna 707 (e.g., corresponding to antenna 4111 of FIG. 21), and transceiver circuitry 701 (also referred to as a transceiver, e.g., corresponding to interface 4114 of FIG. 21, interfaces 4205, 4209, 4211, transmitter 4233 and receiver 4235 of FIG. 22, and radio interface 4537 of FIG. 25) including a transmitter and a receiver configured to provide uplink and downlink radio communications with a base station(s) (e.g., corresponding to network node 4160 of FIG. 21, also referred to as a RAN node) of a radio access network. Communication device 700 may also include processing circuitry 703 (also referred to as a processor, e.g., corresponding to processing circuitry 4120 of FIG. 21, processor 4201 of FIG. 22, and processing circuitry 4538 of FIG. 25) coupled to the transceiver circuitry, and memory circuitry 705 (also referred to as memory, e.g., corresponding to device readable medium 4130 of FIG. 21 coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that separate memory circuitry is not required. Communication device 700 may also include an interface (such as a user interface) coupled with processing circuitry 703, and/or communication device 700 may be incorporated in a vehicle.

As discussed herein, operations of communication device 700 may be performed by processing circuitry 703 and/or transceiver circuitry 701. For example, processing circuitry 703 may control transceiver circuitry 701 to transmit communications through transceiver circuitry 701 over a radio interface to a radio access network node (also referred to as a base station) and/or to receive communications through transceiver circuitry 701 from a RAN node over a radio interface. Moreover, modules may be stored in memory circuitry 705, and these modules may provide instructions so that when instructions of a module are executed by processing circuitry 703, processing circuitry 703 performs respective operations (e.g., operations discussed below with respect to Example Embodiments relating to wireless communication devices). According to some embodiments, a communication device 700 and/or an element(s)/function(s) thereof may be embodied as a virtual node/nodes and/or a virtual machine/machines.

Figure 8:
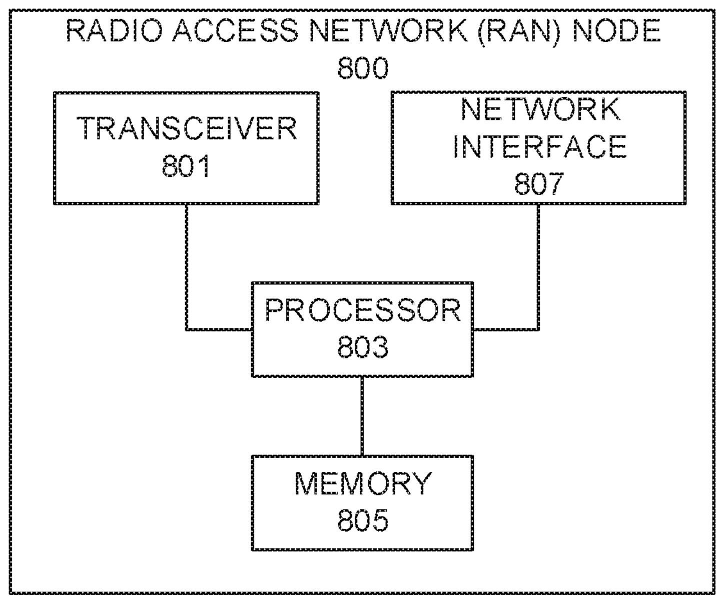
FIG. 8 is a block diagram illustrating a radio access network RAN node (e.g., a base station eNB/gNB) according to some embodiments of inventive concepts.

FIG. 8 is a block diagram illustrating elements of a radio access network RAN node 800 (also referred to as a network node, base station, eNodeB/eNB, gNodeB/gNB, etc.) of a Radio Access Network (RAN) configured to provide cellular communication according to embodiments of inventive concepts. (RAN node 800 may be provided, for example, as discussed below with respect to network node 4160 of FIG. 21, base stations 4412*a*, 4412*b*, and 4412*c* of FIG. 24 and/or base station 4520 of FIG. 25.) As shown, the RAN node may include transceiver circuitry 801 (also referred to as a transceiver, e.g., corresponding to portions of interface 4190 of FIG. 21 and/or portions of radio interface 4527 of FIG. 25) including a transmitter and a receiver configured to provide uplink and downlink radio communications with mobile terminals. The RAN node may include network interface circuitry 807 (also referred to as a network interface, e.g., corresponding to portions of interface 4190 of FIG. 21 and/or portions of communication interface 4526 of FIG. 25) configured to provide communications with other nodes (e.g., with other base stations) of the RAN and/or core network CN. The network node may also include processing circuitry 803 (also referred to as a processor, e.g., corresponding to processing circuitry 4170 of FIG. 21 or processing circuitry 4528 of FIG. 25) coupled to the transceiver circuitry, and memory circuitry 805 (also referred to as memory, e.g., corresponding to device readable medium 4180 of FIG. 21) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the RAN node may be performed by processing circuitry 803, network interface 807, and/or transceiver 401. For example, processing circuitry 803 may control transceiver 801 to transmit downlink communications through transceiver 801 over a radio interface to one or more mobile terminals UEs and/or to receive uplink communications through transceiver 801 from one or more mobile terminals UEs over a radio interface. Similarly, processing circuitry 803 may control network interface 807 to transmit communications through network interface 807 to one or more other network nodes and/or to receive communications through network interface from one or more other network nodes. Moreover, modules may be stored in memory 805, and these modules may provide instructions so that when instructions of a module are executed by processing circuitry 803, processing circuitry 803 performs respective operations (e.g., operations discussed below with respect to Example Embodiments relating to RAN nodes). According to some embodiments, RAN node 800 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device 700 may be initiated by the network node so that transmission to the wireless communication device 700 is provided through a network node including a transceiver (e.g., through a base station or RAN node). According to embodiments where the network node is a RAN node including a transceiver, initiating transmission may include transmitting through the transceiver.

Figure 9:
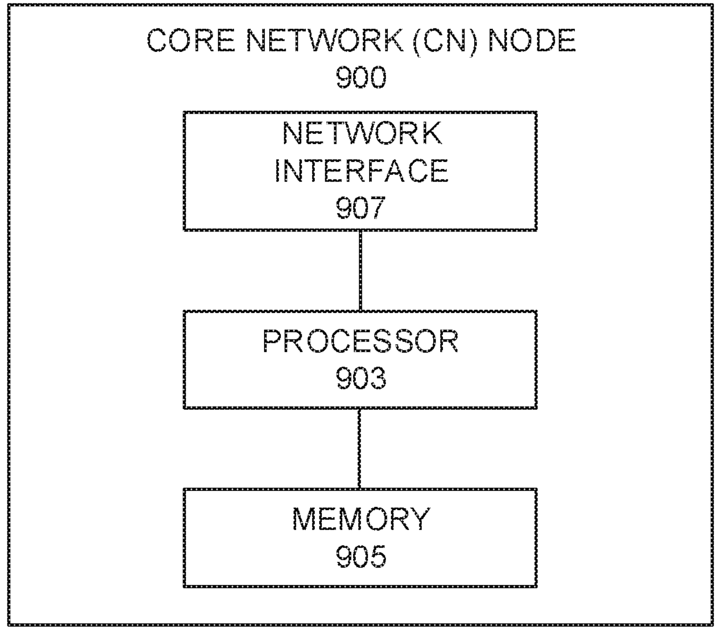
FIG. 9 is a block diagram illustrating a core network CN node (e.g., an AMF node, an SMF node, etc.) according to some embodiments of inventive concepts.

FIG. 9 is a block diagram illustrating elements of a core network CN node (e.g., an SMF node, an AMF node, etc.) of a communication network configured to provide cellular communication according to embodiments of inventive concepts. As shown, the CN node may include network interface circuitry 907 (also referred to as a network interface) configured to provide communications with other nodes of the core network and/or the radio access network RAN. The CN node may also include a processing circuitry 903 (also referred to as a processor) coupled to the network interface circuitry, and memory circuitry 905 (also referred to as memory) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the CN node may be performed by processing circuitry 903 and/or network interface circuitry 907. For example, processing circuitry 903 may control network interface circuitry 907 to transmit communications through network interface circuitry 907 to one or more other network nodes and/or to receive communications through network interface circuitry from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to core network nodes). According to some embodiments, CN node 900 and/or an element(s)/function(s) thereof may be embodied as a virtual node/nodes and/or a virtual machine/machines.

As previously indicated, the challenges of performing CA between a high-bandwidth/high-frequency carrier with a low-bandwidth/low-frequency carrier include:

- Non-collocated nodes: It is typical that the high-frequency carriers will be hosted in different nodes than the low-frequency carriers, as the former are expected to have smaller coverage foot-print and thus scale well if are packaged in their own controlling nodes.
- Large Inter-node delay: The fact that the high-frequency hot-spots will be numerous often leads to less than ideal inter-connect towards nodes controlling the low-frequency cells, primarily due to the constraints on CAPEX/OPEX (capital expenditures/operating expenses).
- Numerology difference: It is typical that the high-frequency carrier will have a larger numerology than the low-frequency carrier.
- Mesh Relationship between carriers: A carrier used as a PCELL can make use of multiple secondary carriers which may be local to the gNB or managed externally by multiple partner nodes. Similarly, a carrier can be simultaneously used to carry local traffic or SCELL traffic from multiple local or external gNB.

However, the advantages of performing CA between a high-bandwidth/high-frequency carrier with a low-bandwidth/low-frequency carrier can include providing network capacity gains by enabling either a higher net bandwidth or by enabling use of DL of the high-frequency beyond the point of UL coverage loss by "moving" the UL channels to the low-frequency carrier.

Problems can arise with current carrier aggregation techniques that rely on either tightly coupled slot-level coordination between nodes or relies on load prediction pre-reservation of air interface resources, both of which have significant disadvantages. For example, slot level control requires inter-node communication delays which are a small fraction of a slot, which is often impossible in many network deployments and with NR is made worse due to the shorter slot numerologies. Prediction of future slot-level demand is also extremely difficult and often leads to inefficiency and inflexibility for the scheduler making it slower to react to new data arrival at the gNB and reduces quality of service handling accuracy. These problems are exaggerated for deployments where there are multiple external partner nodes wishing to share resources on a single carrier.

Various embodiments of inventive concepts decouple the PCELL and SCELL scheduling decision by using either semi-static HARQ codebook or by separating HARQ feedback opportunity separately into virtual PUCCH groups per gNB.

Various other embodiments of inventive concepts manage multiple flows from multiple partners through a congestion control algorithm. The PCELL gNB builds sub-PDU MAC segments which are scaled as a configurable percent of channel bandwidth. The SCELL node can combine the sub-PDU MAC segments or send them individually and the drain rate of these segments is managed through the congestion algorithm.

The sub flows are grouped into similar QoS groups so that the segment drain rate can be treated fairly across different queues.

The queue size can adjust very quickly due to fast feedback which allows efficient and fast reaction to changing data demand from either local or external queues.

Thus, advantages that can be achieved with various embodiments of inventive concepts include:

- tolerating a range of inter-gNB interconnect delay and jitter;
- reacting faster to changing channel and load conditions;
- allowing relatively low data buffering required at SCell gNB and no data duplication with PCell is required;
- enabling multiplex flows from multiple gNB towards a single carrier;
- efficiently using air interface (no per channel pre-reservation, HARQ management, and multiple SE/TTI (spectrum efficiency/transmission time interval) fitting;
- maintaining and supporting QoS infrastructure controlled at the SCell node, and
- supporting flexibility of numerology and BWP (bandwidth part) across the serving cells.

Figure 1:
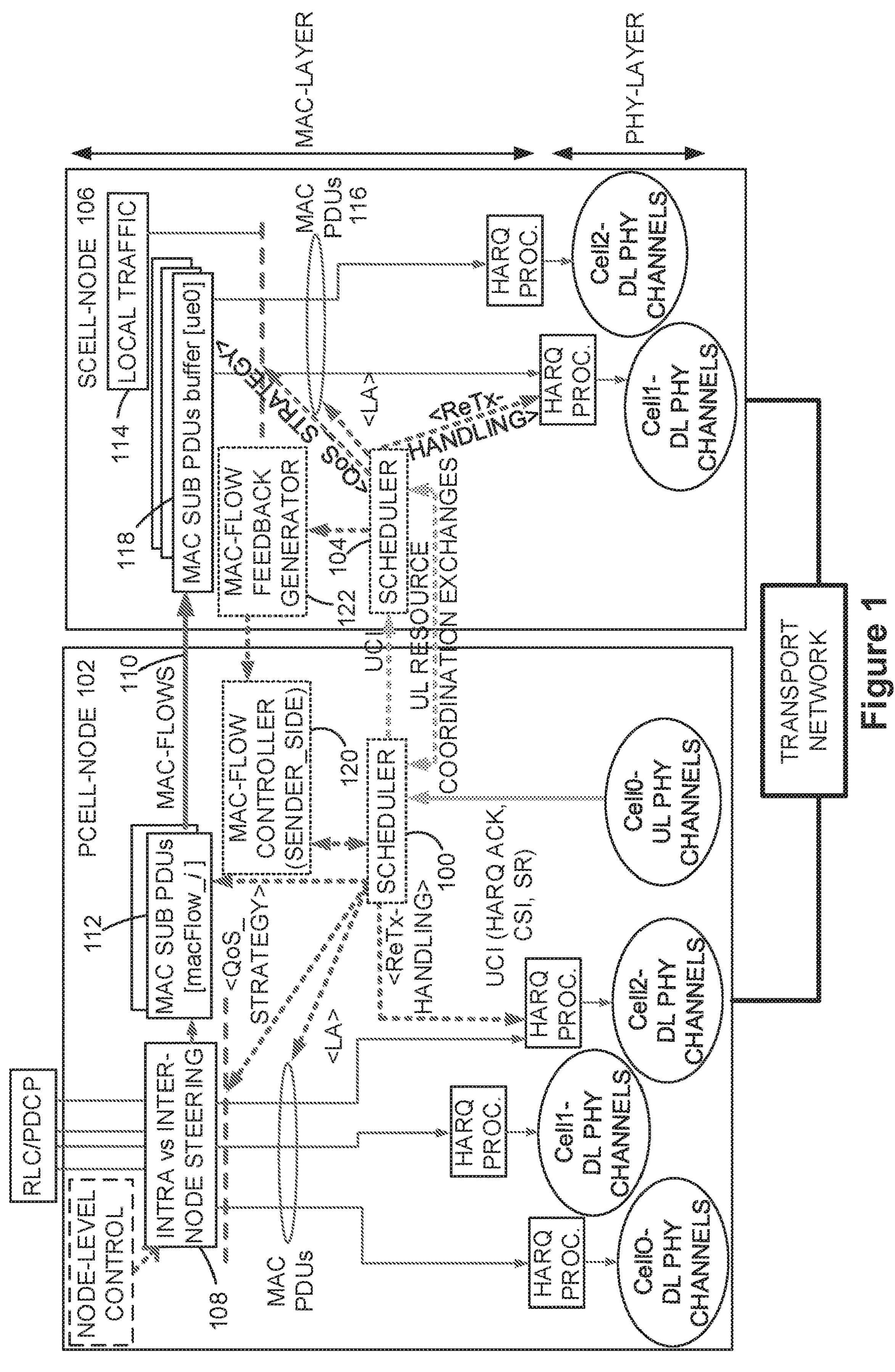
FIG. 1 is a block diagram illustrating components according to some embodiments of inventive concepts.

FIG. 1 illustrates various embodiments of inventive concepts that include a set of mechanisms (and the associated interfaces, procedures, and algorithms) which, when combined, enable downlink CA of cells hosted across different gNBs including the following features:

- Decoupled DL channel allocations across gNBs
- MAC-level data pipelining with flow-control that operates with physical PRB-level awareness of send rate and fast congestion avoidance/backoff
- SCell-gNB provides QoS differentiation of the MAC-flow with a built-in mechanism for L2 data skew-control Overview of the System In the description that follows, for a given communication device 700 configured with inter-gNB CA, the node hosting the PCell (and possibly some SCells) will be referred to as the PCell-gNB. A non-PCell-gNB, which is a node that hosts one or more SCells shall be referred to as an SCell-gNB. Note that, from a communication device's perspective, the fact that the serving cells belong to the same or different gNBs is transparent, and thus the concept of PCell-gNB and SCell-gNB is relevant for the network side only.

Channel Allocations and L1/L2-Control Signaling Strategy

The strategy described below is employed in terms of DL and UL physical channel allocations, and L1/L2 signaling that includes sending DCI to the UE, and requesting UCI (HARQ-ACK UCI and CSI UCI) from the UE. Associated with this is also the strategy of maintaining up-to-date CSI information and HARQ process status across the serving cells. These relate to the light gray paths in FIG. 1. The channel allocations and L1/L2-control signaling strategy includes:

- Scheduler 100 at PCell-gNB 102 is responsible for scheduling PCell and any SCells that are local to it. Scheduler 104 at SCell-gNB 106 is responsible for scheduling SCells hosted there.
- UL channels are configured in PCell only. PCell-gNB scheduler 100 is responsible to schedule PUSCH, as well as reserve/allocate PUCCH for a communication device 700 with separate resource pools, one per gNB.
- Through the mechanism described in mechanism #1 below, the DL slot-level scheduling decisions across the gNBs can be performed independently. UL scheduling can also be decoupled from any DL scheduling on SCell-gNBs 106.
- PCell-gNB 102 is responsible to decode HARQ-ACK UCI. For each UL slot, PCell-gNB 102 needs to know the PUCCH resource and the number of feedback bits it needs to decode which is provided to it by periodic PUCCH allocation reports from the SCell-gNBs 106. PCell-gNB 102 does not need to know the exact semantics of the HARQ-ACK feedback bit in the decoded UCI. It forwards the HARQ-ACK UCI over to the relevant SCell-gNB 106. SCell-gNB 106 interprets the feedback bits to derive information of which TBs did get acknowledged positively, and which would require HARQ-retransmissions.
- PCell-gNB 102 is responsible for polling for CSI reports from the communication device 700 for all serving cells, local and external. The communication device-reported CSI is stored at the PCell-gNB 102. The PCell-gNB 102 sends relevant CSI updates to the SCell-gNBs 106 whenever it is needed. Outerloop tracking/adjustment of SCell's CSI based on the BLER (block error ration) performance can be done either at the PCell-gNB 102 or the SCell-gNB 106.

Data Transfer Strategy

Building on the afore-mentioned decoupled channel allocations, the following data transfer strategy is employed in downlink direction. These relate to the dark gray path in FIG. 1. The data transfer strategy includes:

- PCell-gNB 102 decides in intra vs inter-node steering 108 what proportion of RLC data needs to be sent over local serving cells and what proportion of RLC data needs to be sent over external serving cells. Existing approaches can be taken towards deciding on the data-split between the PCell-gNB 102 and the SCell-gNBs 106. For data towards local serving cells, any intra-gNB data-transfer strategy can be employed. (the specifics of such strategies are known and need not be discussed in detail herein). For data towards external serving cells, the concept of Ext-MAC-flow is introduced.
- An Ext-MAC-flow 110 is defined with respect to each PCell-gNB 102 which forms the source end-point together with a destination end-point that constitutes an external SCell 106, and a MAC-QoS class associated with the flow. In effect, for each gNB, there will be as many Ext-MAC-flows as the number of external cells across all partner gNBs towards which this gNB has established carrier aggregation for one or more communication devices. Note, an Ext-MAC-flow is a cell-level concept as opposed to communication device-level concept.
- For each communication device, PCell-gNB 102 defines a unit of MAC data, here referred to as an Ext-MAC-flow packet 112, with packet-size that scales with the communication device-specific channel quality in a way that each packet has approximately same "resource-needs".
- The SCell-gNB 106, upon receiving the pipelined data, uses the QoS differentiation mechanism that it defines for each Ext-MAC-flow to prioritize this over local traffic 114 as well as over other Ext-MAC-flows.
- For each communication device 700 and towards a given SCell, when prioritized, SCell-gNB 106 creates a MAC PDU 116 (transport block) by multiplexing one or multiple of the Ext-MAC-flow packets 118 of that communication device 700, in sequence. Note, each Ext-MAC-flow packet is not segmented further in order to fit to the MAC PDU. SCell gNB 106 has full control over air-interface link-adaptation including MCS and rank selection.
- SCell-gNB 106 employs a mechanism to mitigate the possible skew in over-the-air transmissions of the subsequent bytes of the RLC data by prioritizing Ext-MAC-Flow packets when they are delayed beyond a threshold.
- SCell-gNB 106 is also responsible to prioritize any pending HARQ-retransmissions required for the SCell traffic versus other new/re-transmissions.
- With the help of a congestion-aware flow-control mechanism 120 that operates per Ext-MAC-flow, PCell-gNB 102 decides the rate at which it sends Ext-MAC-flow packets. Ext-MAC-flow control 120 operates at the granularity of the Ext-MAC-flow packets and in a communication device-neutral way, which is different from prior-art on data splitting across nodes that use some indirect ways to infer the desired send-rate for a given communication device/bearer. SCell-gNB106 assists in the flow-control by providing regular feedback on the number of consumed packets via mac-flow feedback generator 122, as well as congestion indications when they occur.

The various embodiments of providing CA may utilize the following constituent mechanisms:

- Decouple precise air-slot timing
- Resource-scaled MAC data pipelining and resource allocation
- L2-skew aware SCell resource allocation via differentiated QoS treatment Cell-level inter-gNB flow control with QoS differentiation and fairness constraints Decouple Precise Air-Slot Timing NR standards require some information carried in L1-transmissions across the serving cells to be mutually consistent in order to ensure the correct communication device behavior for HARQ-ACK feedback. They also impose constraints on DL scheduling that depend on the UL scheduling decisions made in recent time-slots. Hence, the ability to use carrier aggregation across multiple gNBs requires that the host-gNBs agree on a mechanism that ensures that the signaling towards the communication device 700 is compliant. One existing approach would be to consider SCell-gNB as a slave-gNB whereby it sets aside some resources for the SCell-traffic, and relinquishes the DL channel allocation decisions on those reserved resources to the PCell-gNB's scheduler. However, using this approach causes the schedulers in the two gNBs to not being able to operate more or less independently. Obviously, this imposes coordination requirements between the schedulers. Since the transport characteristics (delay, jitter, loss, in-order-vs-out-of-order) of the inter-gNB link can be such that a slot-level coordination would be infeasible, an innovative way to achieve a level of decoupling of the scheduling decisions across the schedulers can be achieved by:

PUCCH resource partitioning in the form of Virtual PUCCH Groups or

PUSCH scheduling restrictions

PUCCH Resource Partitioning in the Form of Virtual PUCCH Groups (VPGs)

PCell-gNB 102 partitions the uplink slots of a PCell in a way that serving cells hosted by the same gNB (and thus scheduled by a common scheduler) get PUCCH resources on UL slots that do not overlap with UL slots used in any other serving cells hosted in a different gNB. More specifically:

1. For each communication device 700, the PCell-gNB 102 defines one or more "virtual PUCCH groups", VPGs. Serving cells hosted at the same gNB constitute one VPG. For example,
   VPG ID=0 for a serving cell in PCell-gNB 102 including the PCell
   VPG ID=1 for a serving cell in first SCell-gNB 106 and so on.
2. Each VPG per communication device 700 is mapped to a unique UL slot of the PCell carrier. This mapping can be done either semi-statically (during CA configuration change) or dynamically. A simple example would be to assign slots uniformly to the configured VPGs, and update when the number of VPGs changes. In the following example, for a particular UE, there are two VPGs (vPucchGroupId=0 and 1). PCell-gNB 102 maps VPG #0 to even-numbered UL slots and VPG #1 to odd-numbered UL slots of the PCell carrier.

| | Slot = n | Slot = n + 1 | Slot = n + 2 | Slot = n + 3 | | |
|---|---|---|---|---|---|---|
| vPucchGroupId | 0 | 1 | 0 | 1 | 0 | 1 |

Figures 2, 3:
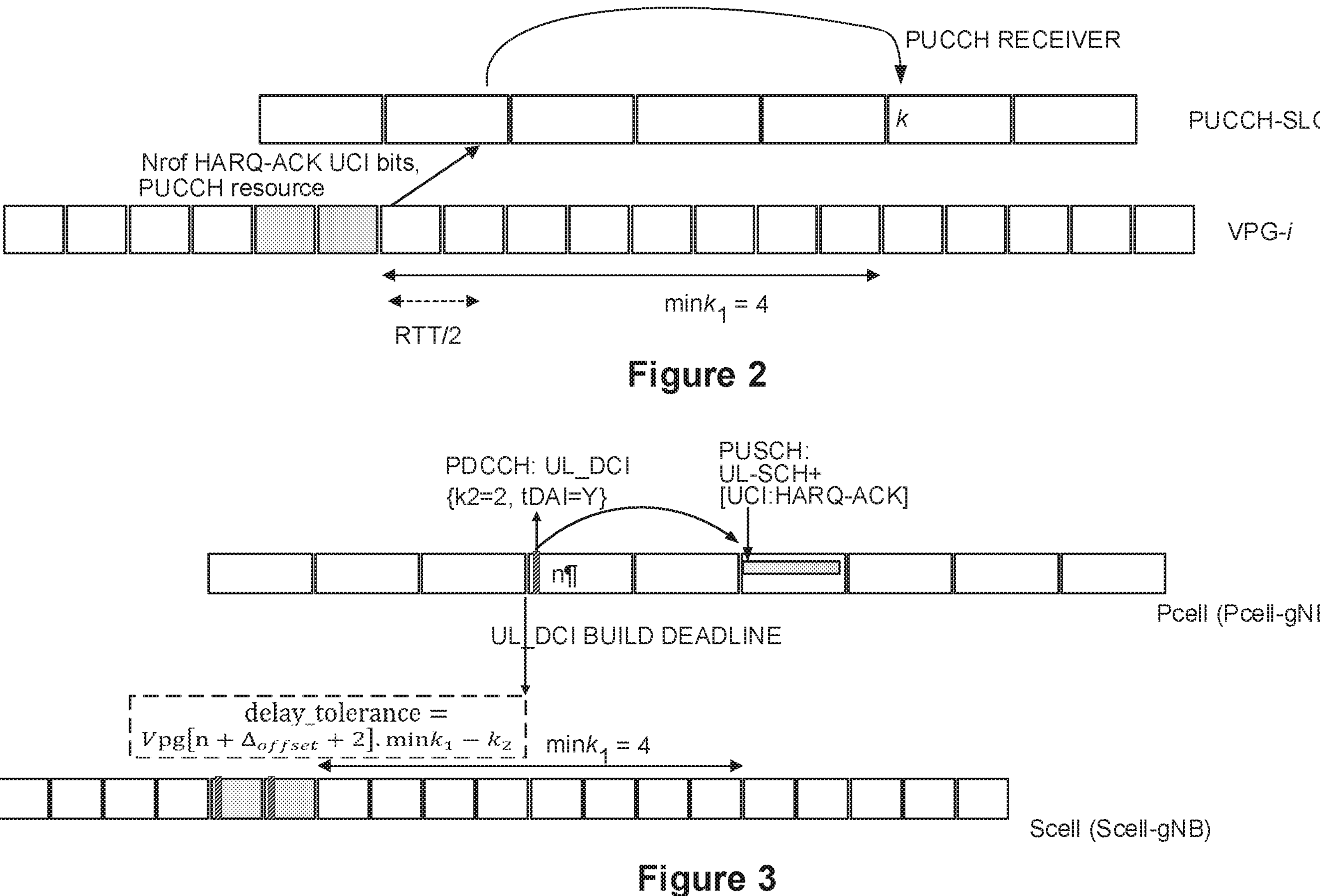
FIG. 2 is an illustrating of PUCCH allocation reports per virtual PUCCH Groups (VPG) according to some embodiments of inventive concepts.
FIG. 3 is an illustration of K2 threshold as a function of mink1 of a VPG according to some embodiments of inventive concepts.

3. For each newly-active connection with traffic towards VPG-i, PCell-gNB 102 reserves one or multiple PUCCH resources. The reserved resources can be of any PUCCH format, and in any PUCCH resource-set, and only valid for slots onto which the VPG is mapped. The reserved resources are indicated to the gNB scheduler owning the VPG-i, via signaling over the inter-gNB coordination link. For each reserved resource, the min and max-payload of HARQ-ACK UCI is also provided.
4. DL channel allocations (PDCCH and PDSCH) across all the serving cells of a VPG are carried out by the same scheduler and do not need information on the state of DL channel allocations on the other VPGs, for example, when signaling the correct value of cDAI and tDAI in the DL DCI. For a DL assignment, the DL scheduler in VPG-i can pick an appropriate PUCCH resource from the set of reserved resources. This is governed by the size of the expected HARQ-ACK UCI, which is a function of the number of transmitted TBs. The appropriate value of $k_1$ is picked based on the resource/slot that is chosen for HARQ-ACK UCI. The allowed set of $k_1$ values for each VPG-i can in general be different across the VPGs. This information is part of the communication device's semi-static RRC configuration. $mink_1$ [vpgi] represents the minimum value of allowed $k_1$ for VPG-i.
5. For every UL slot k to which VPG-i is mapped, the scheduler for VPG-i reports the number of allocated HARQ-ACK bits on that slot and the selected PUCCH resource (at the end of slot $k-mink_1$ [vpgi] (slot specified in the PUCCH numerology). This allows the PCell-gNB 102 to setup the appropriate PUCCH receiver with the appropriate number of expected UCI bits for decoding. The delay between the VPG node sending its PUCCH allocation reports and the PCell-gNB 102 receiving this information is one-way inter-gNB delay. Since this information has to arrive before PCell-gNB 102 sets-up receiver for the PUCCH transmission, configuration will ensure that $mink_1$ for the VPG is greater than the RTT/2 with some margin. This is illustrated in FIG. 2.

PUCCH Allocation Restrictions

The concept of virtual PUCCH groups and the enabling mechanism described above enable independent DL channel allocation decisions across the schedulers 100, 104 in the PCell-gNB 102 and the SCell-gNBs 106. However, there is an additional constraint in NR whereby if communication device 700 receives an UL grant at slot n for PUSCH on UL slot $n+k_2$, (for some $k_2$), any previously scheduled UCI on PUCCH (for example, HARQ-ACK UCI) is "routed" to the PUSCH. Moreover, the communication device 700 expects that no PDSCH allocation will be done afterwards that requires communication device 700 to provide HARQ-ACK on slot $n+k_2$. This brings a potential coupling between PUSCH scheduling decision on PCell-gNB 102 and DL scheduling decisions on SCell-gNBs 106. When favoring decoupling over coordination, the latter in fact can be quite complex as it involves the case of distributed arbitration. The following methodology runs in the PCell-node scheduler 100 which uses the configuration data of the VPGs to impose PUSCH allocation restrictions. No explicit coordination/arbitration is required.

Methodology

PCell-gNB 102 computes $k_{2,threshold}$, a threshold value for $k_2$, such that for every possible PUSCH allocation towards an UL slot that belongs to VPGs of the external serving cells, it is disallowed if the required $k_2$ is greater than $k_{2,threshold}$. The value of the threshold is picked in a way that the PUCCH allocation reports from "external VPGs", as described above in number 5 of the PUCCH resource partitioning in the form of Virtual PUCCH Groups description arrive in time before the UL DCI is sent towards the target UL slot so that the DAI field in the UL DCI can be correctly filled. The detailed pseudo-code is presented in Pseudo Code 1. An illustrating example is presented in FIG. 3.

FIG. 3 provides an illustration of $k_{2,threshold}$, as a function of $\text{mink}_1$ of a VPG. In FIG. 3, an FDD PCell is operating with numerology 0, and an external SCell is operating with numerology 1, each mapped to two different VPGs. At slot n, UL scheduler at PCell-gNB 102 wants to determine if it can perform PUSCH allocation with PDCCH (with the UL grant) in the next slot n with a $k_2=2$. That corresponds to the target PUSCH slot of n+2. If slot n+2 is mapped to PCell's VPG, no special consideration is needed as it is the case of "normal" scheduling use-case. The ability to use the slot for PUSCH is governed by the state of DL and UL allocations made previously. However, if slot n+2 is mapped to an "external" VPG, the PCell-gNB 102 needs to guarantee that the PUCCH allocation reports (as described above) from that VPG arrives before the deadline to build the UL DCI, as it needs to correctly populate the tDAI field. Since the latest time when the report will be sent from the SCell-gNB 106 is the end of the "grey-slots" based on the $\text{mink}_1$ of that VPG, the tolerance in communication delay is given by the difference $\text{mink}_1-k_2=4-2=2$ (PCell) slots.

Pseudo Code 1

Input:
- $K_2$: set of all RRC-configured $k_2$ values.
- List of all VPGs and their slot-mappings
- $k_{2,threshold}$ [vpgi]: A threshold on $k_2$ computed according to Equation 1.

Algorithm:

At any slot n:
- Pick a set of valid $k_2$:s based on some criteria (for example, it depends on the type of the request and the associated processing requirements on the request)
  - ○ $K_2(n) \subseteq K_2$
- ● For $k_2 \in K_2(n)$
  - ● $n_{target} = n + k_2$
  - ● $VPG_{target}$ = VPG to which slot $n_{target}$ is mapped to
  - ● If $VPG_{target}$ is PCell's VPG
    - ● If pusch allocation not okay at $n_{target}$ due to previous local DL/UL allocations
      - ● $K_2(n)$.remove($k_2$)
    - ● End
  - ● Else
    - ● If $k_2 > k_{2,threshold}[VPG_{target}]$
      - ● $K_2(n)$.remove($k_2$)
    - ● End If
  - ● End If
- ● End For Output:

Allowed PUSCH allocation values $K_2$ (n) at slot n. If $K_2$ (n) is empty, that implies no PUSCH allocation decision can be made at slot n.

Threshold Computation for VPG-i $$k_{2,threshold}[vpgi] = \text{min}k_1[vpgi] - \left(\frac{RTT}{2} + \text{margin}\right) \quad \text{Equation 1}$$

RTT is average round-trip delay between PCell-gNB and the SCell-gNB hosting the VPG-i, expressed in the units of number of slots in PCell-numerology. Margin is based on the observed variance in the inter-gNB delay.

Resource-scaled MAC-level data pipelining and resource allocation

An Ext-MAC-flow 110 is defined with respect to each PCell-gNB 102 which forms the source end-point together with a destination end-point that constitutes an external SCell, and a MAC-QoS class associated with the flow. In effect, for each gNB, there will be as many Ext-MAC-flows as the number of external cells across all partner gNBs towards which this gNB has established carrier aggregation for one or more communication devices. Note, an Ext-MAC-flow is a cell-level concept as opposed to a communication device-level concept. For the ease of exposition, the case of one MAC-QoS class shall be assumed, thus it will be assumed that each gNB has as many outgoing Ext-MAC-flows as the number of external cells. Also, an SCell-gNB 106 has as many incoming Ext-MAC-flows as the number of SCells it hosts across all the partner PCell-gNBs 102.

For each communication device, PCell-gNB 102 defines a unit of MAC data, here referred to as Ext-MAC-flow packet, with packet-size that scales with the communication device-specific channel quality, and with a certain target number of PRBs that would be required based on the current estimation of CSI.

Ext-MAC-Flow packet size for communication device i toward an SCell can be calculated as $$\frac{ICC[i] \times N_{PRB}^{scell} \times n_{RE}}{B}$$

where ICC[i] is the information carrying-capacity (in the units of bits per RE) and is some measure of spectral efficiency based on the most up-to-date wide-band channel-quality (example, communication device-reported CQI corrected with some BLER-based adjustments), $$N_{PRB}^{scell} = \text{Number of } PRBs \text{ in the } SCell,$$

$n_{RE}$=Approximate number of REs per PRB available for PDSCH, and B=A parameter that controls the target-fraction of the SCell bandwidth that is needed to fit one packet. For example, if B=8, one packet would consume roughly one-eighth of the SCell bandwidth.

Due to the strategy to scale the packet-sizes with same "resource-demand" target B, Ext-MAC-flow can be seen as a stream of data units that have uniform resource demands despite the fact that the individual data units belong to different communication devices or different serving cells which, in general, have different channel qualities.

SCell-gNB 106, upon receiving the pipelined data, uses the QoS differentiation mechanism that it defines for each Ext-MAC-flow to allow prioritization of traffic amongst each Ext-MAC flow and traffic local to S-cell-gNB 106.

PDCCH link adaptation (determining the number of CCEs, etc.) as well as PDCCH resource allocation for the required DL assignments is done at SCell-gNB 106 for its SCells, based on available CSI information.

For each communication device 700 and towards a given SCell, when prioritized, SCell-gNB 106 performs PDSCH link adaptation and creates a MAC PDU (transport block) by multiplexing one or multiple of the Ext-MAC-flow packets. It does so in-sequence and without segmenting the Ext-MAC-flow packets. In other words, the SCell-gNB 106 allocates the available PRBs on the SCell to the N oldest Ext-MAC-Flow packets queued to be served on this SCell. The most up-to-date CSI estimation can be used to determine the size of the MAC PDU, and thus the value of N. Note, each Ext-MAC-flow packet is not segmented further even if that would lead to the ability to use more of the available PRBs. If needed, MAC paddings can be added when building the MAC PDUs on top of the multiplexed Ext-CA-Flow packets. This strategy of not segmenting the Ext-MAC-Flow packets results in SCell-gNB's MAC data handling to be very simple.

SCell-gNB 106 is also responsible to prioritize any pending HARQ-retransmissions required for the SCell traffic versus any new/retransmissions. This can be done using existing mechanism of prioritizing retransmissions vs new transmissions.

L2-Skew Aware SCell Resource Allocation Via Differentiated QoS Treatment

Figure 4:
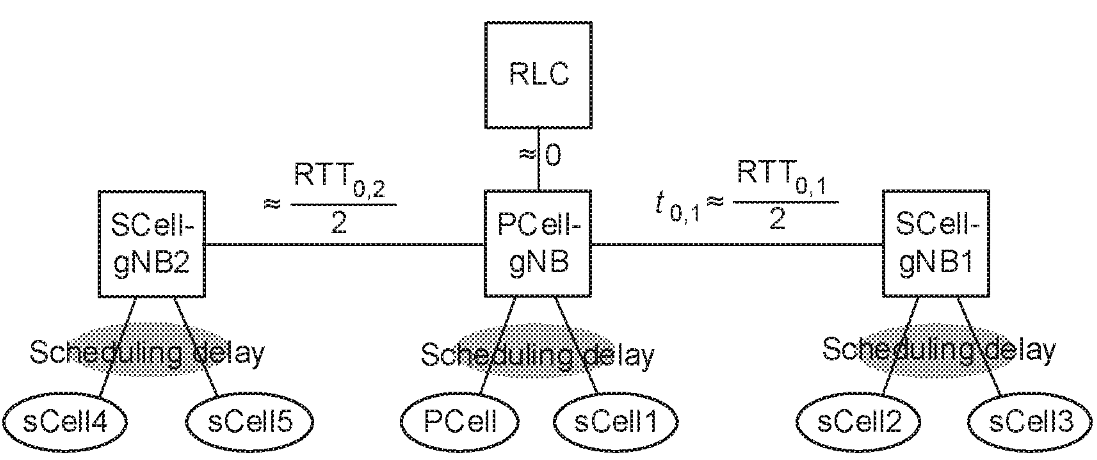
FIG. 4 is an illustration showing different delays that affect the L@-data skew.

SCell-gNB 106 also considers the possible skew in over-the-air transmission of the subsequent bytes of RLC SDUs if PCell-gNB 102 and/or other SCell-gNBs 106 would have transmitted subsequent bytes of RLC SDU at different over-the-air times. A part of such skew is attributed to the skew in the delay between the gNBs. The other skew is attributed to the difference in scheduling delay at each gNB, which is in turn related to the variation in the short-term traffic characteristics in each node. This is illustrated in FIG. 4.

For skew-control, SCell-gNB 106 employs a priority-boost for the Ext-MAC-flow traffic when the age of the oldest packet exceeds a certain threshold. This delay threshold can be adapted to the perceived inter-gNB delay, load conditions, and the communication device's L2 buffering capabilities. In order to assist SCell-gNB 106 determine the age of the oldest packet, PCell-gNB 160 augments the Ext-MAC-Flow packet with the meta-data that includes the time when the packet was built by the RLC layer.

Scheduling priority=

Normal scheduling priority if the age of the oldest Ext-MAC-Flow packet<=delay_threshold High scheduling priority if the age of the oldest Ext-MAC-Flow packet>delay_threshold Boosting the scheduling priority of the Ext-MAC-Flow packet as it ages increases the probability the packet is delivered to the communication device in timely manner before RLC tReassembly timer expires and potentially unnecessary RLC ARQ retransmissions are triggered.

Cell-Level Inter-gNB Flow Control with QoS Differentiation and Fairness Constraints The system defines a number of QoS-classes. PCell-gNB 102 runs congestion-aware flow-control per Ext-MAC-Flow per QoS-class. In addition to be the granularity of flow-control, each QoS-class also gets a distinct QoS treatment on the SCell in terms of the scheduling priority versus other Ext-MAC-Flows and local traffic.

One important advantage of running flow control per-cell per QoS-class is the scalability aspect. Conventional flow-control schemes employed in other aggregation solutions like Dual Connectivity with PDCP or RLC-layer split operate per bearer which does not scale as well as the number of active users increases.

For the ease of description, there is one QoS-class and thus one flow-control per Ext-MAC-Flow.

The flow-control state machine upper-bounds the number of Ext-MAC-Flow packets that the PCell-gNB 102 can send towards the external-SCell at any point in time.

Flow-control tracks the number of Ext-CA-Flow packets that are sent towards the external SCell, and the number of packets consumed at the SCell-gNB 106 based on the periodic flow-control feedback sent by the SCell-gNB 106. In particular, the following state variables are maintained:

flightSize: Number of Ext-CA-Flow packets sent to the SCell for which the corresponding Flow-control feedback has not been received window: Max flight-size SCell-gNB 106 sends flow-control feedback for each SCell to its partner PCell-gNB 102 periodically, say, every subframe. The flow-control feedback includes the following information Number of Ext-CA-Flow packets consumed, nSent, since last feedback. Consumed includes data scheduled for initial transmission, any data lost, expired and dropped.

congestionIndication flag which indicates congestion at SCell. congestionIndication can be derived based on different criteria that reflect the load-situation at SCell. One direct method would be to derive this based on if any Ext-CA-Flow traffic on that SCell experienced delay that exceeds the delay threshold mentioned above.

Figure 5:
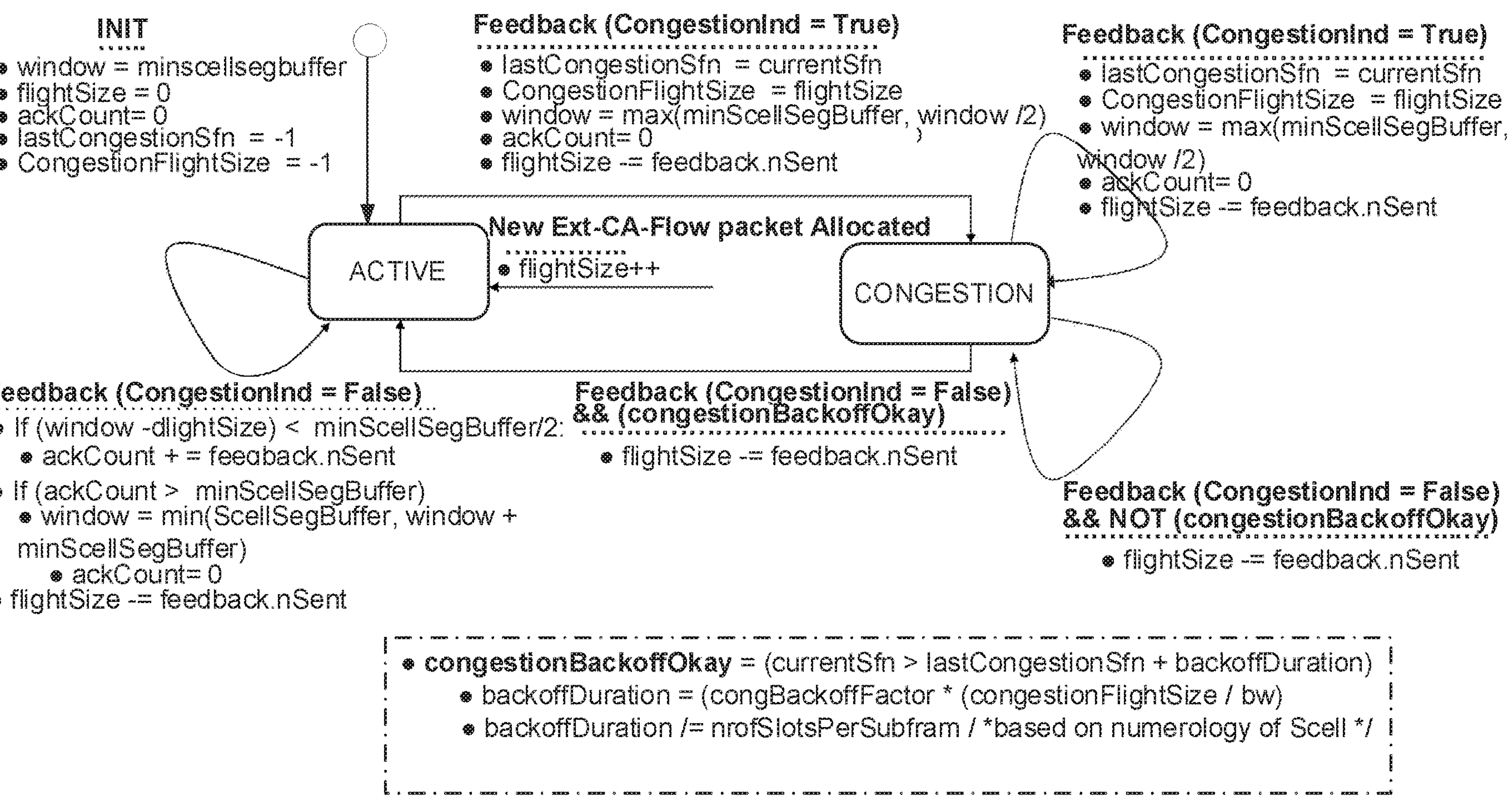
FIG. 5 is an illustration of a flow-control state machine according to some embodiments of inventive concepts.

A Flow-control algorithm can be represented by a state-machine with two main states: ACTIVE and CONGESTION. An example of a state-machine is illustrated in FIG. 5.

At ACTIVE state, the number of packets that can be sent is given by window—flightSize. At CONGESTION state, the number of packets that can be sent is 0.

The state-machine starts at ACTIVE state with some initial values for the state variables. minScellSegBuffer is a parameter of the algorithm that defines the initial window and guarantees that the algorithm "probes" the SCell's state of congestion before any feedback is received.

window=minScellSegBuffer flightSize=0

For every new packet sent to the SCell-side, flightSize is incremented.

During ACTIVE state, a flow-control feedback that is received from the SCell-gNB 106 is used to reduce the flightSize by the value indicated in the feedback.nSent. Moreover, if the feedback indicates no congestion: based on the current flightSize and the current value of window, the algorithm determines if the SCell has been probed enough to consider increasing the value of window. In the example algorithm in FIG. 5, we show the use of another variable ackCount to achieve this. In the example algorithm, window is incremented by a fixed-step which results in a linear increase as depicted in FIG. 6 if subsequent increments in window do not lead to congestion.

congestion: the state-machine transitions to CONGESTION state. window is reduced, typically at a multiplicative rate. In the example algorithm, for every congestion indication, window is reduced by half. In the event of subsequent congestion indications, the window decrements due to the example algorithm is depicted in FIG. 6.

During CONGESTION state, a flow-control feedback that is received from the SCell-gNB is used to reduce the flightSize by the value indicated in the feedback.nSent. Moreover, if the feedback indicates congestion: This means that the state of congestion on the SCell has persisted. The state-machine remains at CONGESTION state.

no congestion: The state-machine could transition to ACTIVE state. However, it is prudent to delay the transition to ACTIVE state for the following reason. As we described in Mechanism #3, SCell-gNB prioritizes the Ext-CA-Flow data if the data is buffered for too long. Thus, the deeper is the state of congestion, the higher is the chance that the Ext-CA-Flow gets priority-boost for longer, which can easily starve the local traffic at SCell-node. This can negatively adverse the fairness aspect. In order to maintain fairness, the flow-control delays the transition to ACTIVE state by a congestion-backoff period, which itself can be defined based on the "depth" of congestion. One example of the congestion-backoff period is shown in FIG. 6. Such a backoff helps achieve fairness between the Ext-CA-Flow and the local traffic on the SCell, as it throttles the send-rate as a function of the severity of congestion.

In the description that follows, while the first network node may be any of the network node 800, the network node 4160, base stations 4412, the host computer 4430, and the base station 4520, the network node 800 shall be used to describe the functionality of the first network node. The network node 800 (implemented using the structure of the block diagram of FIG. 8) is configured to operate as a first network node will now be discussed with reference to the flow chart of FIG. 10 according to some embodiments of inventive concepts. For example, modules may be stored in memory 805 of FIG. 8, and these modules may provide instructions so that when the instructions of a module are executed by respective network node processing circuitry 803, processing circuitry 803 performs respective operations of the flow chart.

Turning to FIG. 10, in block 1001, the processing circuitry 803 defines a number of media access control, MAC, flows from the first network node that each forms a source end-point to a destination end-point, wherein the first network node comprises the source end-point and each destination end point comprises a second network node having one or more destination carriers. Details of some embodiments of inventive concepts of defining the number of MAC flows are described above in the description of the data transfer strategy.

In block 1003, the processing circuitry 803 defines a MAC flow packet size that is scaled based on carrier bandwidth where each MAC flow packet has an approximately equivalent spectrum usage and an equivalent quality of service, QoS, on a destination carrier on the second network node.

In some embodiments of inventive concepts, the MAC flow packet size is defined as a percent of a channel bandwidth of the sub-PDU MAC flow. In some of these embodiments, the MAC flow packet size is defined in accordance with $$MAC\ \text{flow packet size} = \frac{ICC[i] \times N_{PRB}^{scell} \times n_{RE}}{B}$$

where ICC[i] is information carrying-capacity in units of bits per RE, $$N_{PRB}^{scell}$$

is a number of PRBs in the secondary cell, SCell, (where the MAC flow packet is used), $n_{RE}$ is an approximate number of resource elements, REs, per PRB available for physical downlink shared channel, PDSCH; and B is a parameter that controls the target-fraction of the SCell bandwidth that is needed to fit one MAC flow packet. Additional details of some of these embodiments of inventive concepts are described above in at least the section of resource-scaled MAC-level data pipelining and resource allocation.

Defining the MAC flow packet size in some embodiments of inventive concepts is defined as a percent of a channel bandwidth of the sub-PDU MAC flow. In other embodiments of inventive concepts, the MAC flow packet size is defined for UEi towards an SCell, wherein the MAC flow packet scales with UE-specific channel quality and a target number of physical resource blocks (PRBs) required based on a current estimation of channel state information, CSI.

In yet other embodiments of inventive concepts, the number of MAC flows is defined by defining a MAC flow for each quality of service, QoS level such that data from all UEs associated with the first network node of a defined QoS level are transported to a second network node having a destination SCell using a MAC flow corresponding to the defined QoS level. In these embodiments, responsive to receiving data in at least one MAC flow, the processing circuitry 803 uses quality of service, QoS, differentiation defined for each MAC flow to provide prioritization of traffic among each of the at least one MAC flow and traffic local to the.

Details of some embodiments of inventive concepts of defining the MAC flow packet size are described above in at least the section of resource-scaled MAC-level data pipelining and resource allocation.

In block 1005, the processing circuitry 803 transmits a MAC flow packet to the second network node, wherein the MAC flow packet comprises a bundle of one or more MAC sub-protocol data units, sub-PDUs. A MAC sub-PDU in some embodiments is defined as either MAC sub-PDU header appended radio link control (RLC) data (RLC PDU or RLC segment, or RLC status PDU) from one of the logical channels or is a MAC level control message.

As described above, the MAC flow is a cell-level concept of inventive concepts as opposed to communication device-level (e.g., UE-level) concepts. In order for the MAC flow to be used, channel allocations should be decoupled as much as possible.

One approach to decouple the channel allocations is to use virtual PUCCH groups, referred to herein as VPGs. Thus, turning to FIG. 11, in block 1101, the processing circuitry 803 decouples primary cell (PCell) (e.g. cells associated with the first network node) and secondary cell (SCell) (e.g., cells associated with the second network node) scheduling decisions by separating hybrid automatic repeat request (HARQ) feedback opportunity separately into virtual physical uplink control channel (PUCCH) groups, VPGs, per network node and per UE. Various embodiments of inventive concepts of VPGs are described in further detail in at least the sections of PUCCH resource partitioning in the form of VPGs, PUCCH restrictions, and methodology.

Figure 12:
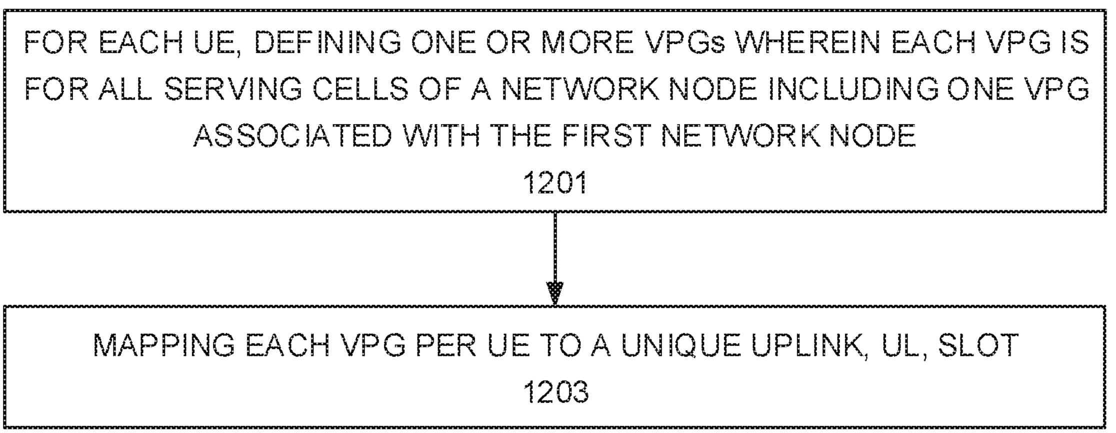

Turning to FIG. 12, in some embodiments of inventive concepts, separating HARQ feedback opportunity separately into VPGs includes, the processing circuitry 803 for each UE, defining in block 1201 one or more VPGs wherein each VPG is for all serving cells of a network node including one VPG associated with the first network node. The processing circuitry 803, in block 1203, maps each VPG per UE to a unique uplink, UL, slot.

Figure 13:
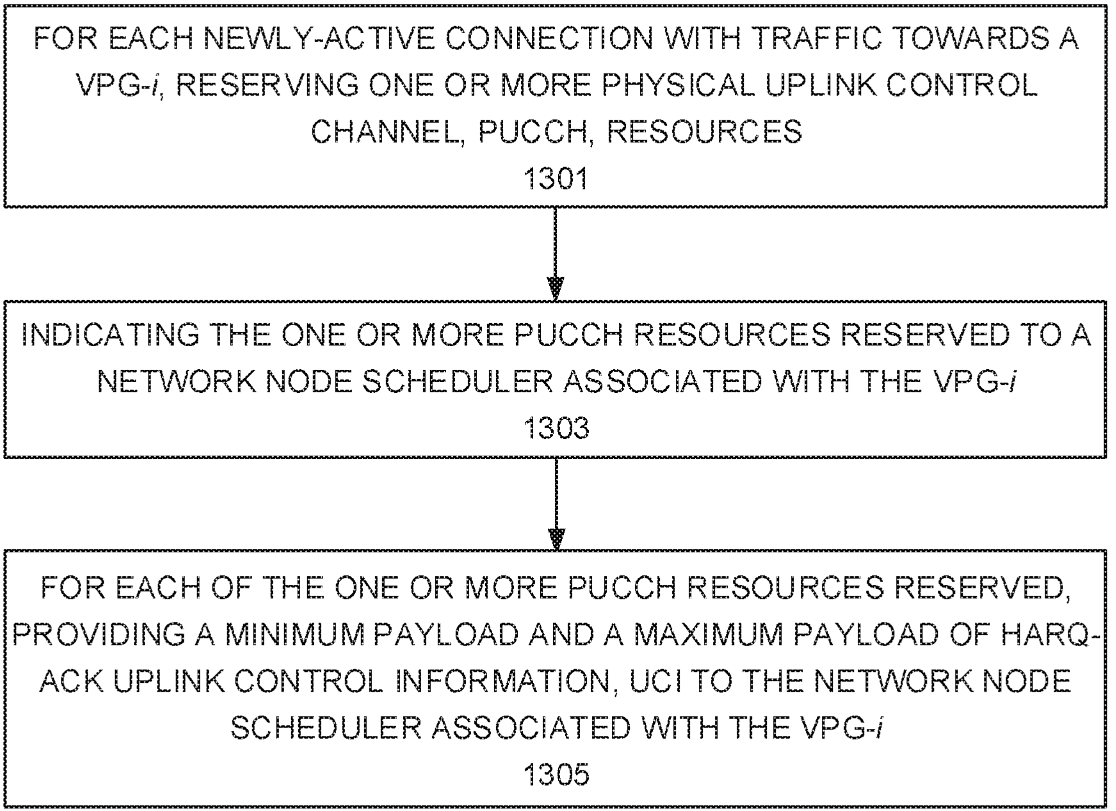

Turning to FIG. 13, in block 1301, for each newly-active connection with traffic towards a VPG-i, the processing circuitry 803 reserves one or more physical uplink control channel, PUCCH, resources. In block 1303, the processing circuitry 803 indicates the one or more PUCCH resources reserved to a network node scheduler associated with the VPG-i. In block 1305, for each of the one or more PUCCH resources reserved, the processing circuitry 803 provides a minimum payload and a maximum payload of HARQ-ACK uplink control information, UCI to the network node scheduler associated with the VPG-i. As described above, partitioning the uplink slots of a PCell in a way that serving cells hosted by the same gNB (and thus scheduled by a common scheduler) get PUCCH resources on UL slots that do not overlap with UL slots used in any other serving cells hosted in a different gNB enables the network node schedulers to decouple scheduling decisions across schedulers so that the network node schedulers and independently make scheduling decisions.

For every UL slot k to which a VPG-i is mapped, the scheduler for the VPG-i may report various indications of parameters and the like to the first network node. Turning to FIG. 14, in block 1401, the processing circuitry 803 for a slot k to which VPG-i is mapped, receives an indication of a number of allocated HARQ-ACK bits on the slot k from a VPG-i node and an indication of a PUCCH resource selected at an end of slot k.

In block 1403, the processing circuitry 803, responsive to receiving the number of allocated HARQ-ACK bits, sets up a PUCCH receiver or a physical uplink shared channel, PUSCH, receiver with a number of expected UCI bits for decoding allocated resources on the PUCCH or the PUSCH. For example, if a UE sends feedback bits and it also has a PUSCH grant, the information is carried on PUSCH and not PUCCH.

There can be a delay between the VPG-i node sending the indication and receiving the indication. The delay between the VPG-i node sending the indication of the number of allocated HARQ-ACK bits and receiving the indication is a one-way inter-node delay. In some embodiments of inventive concepts, the processing circuitry 803 may set up a PUCCH receiver for PUCCH transmission including ensuring that $mink_1$ for VPG-i is greater than the one-way inter-node delay where $mink_1$ is a minimum value of allowed $k_1$ for VPG-i. These embodiments are described above in at least the section on PUCCH resource partitioning in the form of Virtual PUCCH Groups (VPGs).

Figure 15:
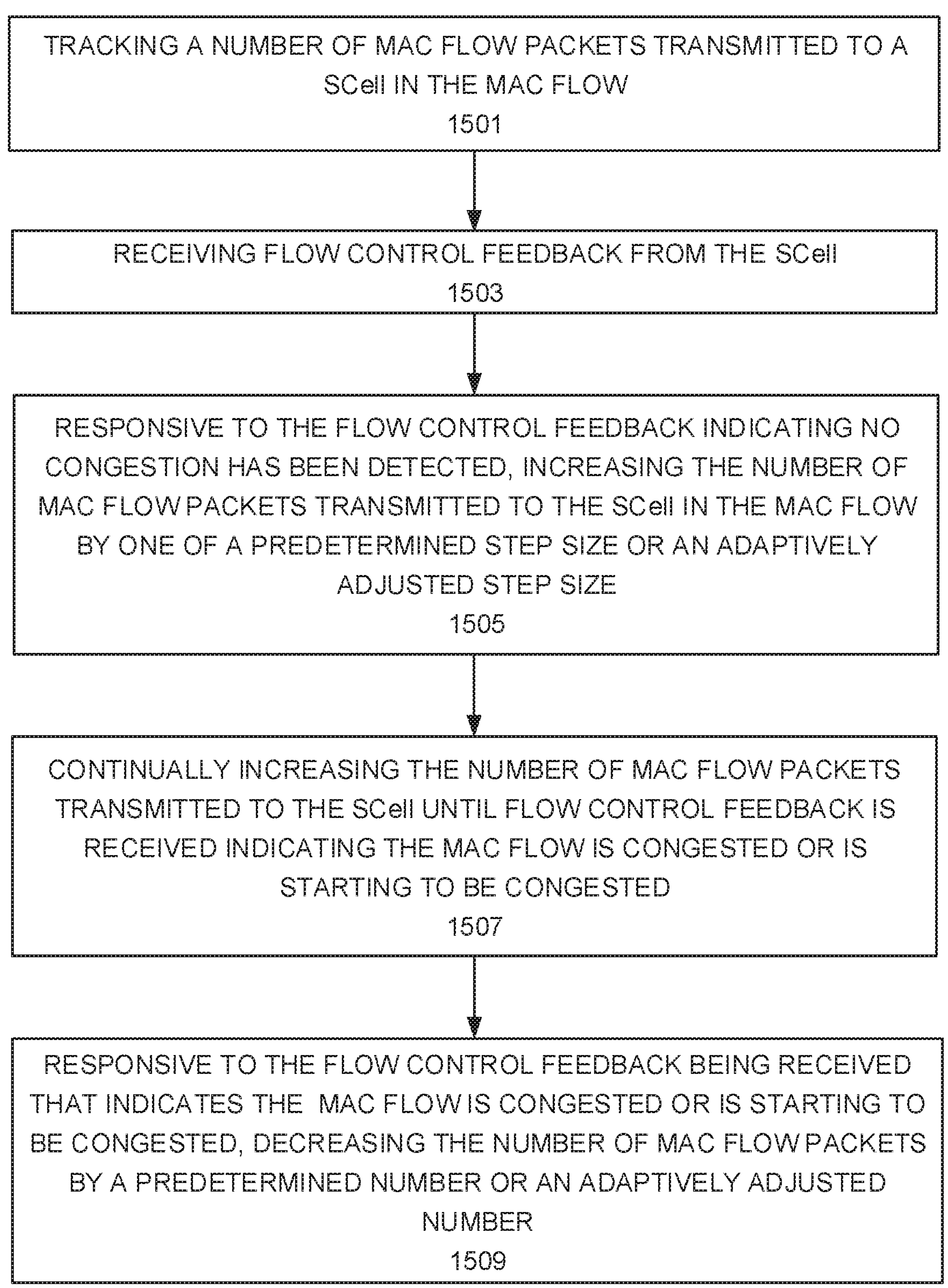

In various embodiments of inventive concepts, the first network node performs congestion control on each MAC flow independent of other MAC flows. FIG. 15 illustrates some embodiments of congestion flow control. Turning to FIG. 15, in block 1501, the processing circuitry 803 tracks a number of MAC flow packets transmitted to a SCell in the MAC flow. In block 1503, the processing circuitry 803 receives flow control feedback from the SCell.

The feedback may indicate congestion or no congestion. In block 1505, responsive to the flow control feedback indicating no congestion has been detected, the processing circuitry 803 increases the number of MAC flow packets transmitted to the SCell in the MAC flow by one of a predetermined step size or an adaptively adjusted step size. In block 1507, the processing circuitry 803 continually increases the number of MAC flow packets transmitted to the SCell until flow control feedback is received indicating the MAC flow is congested or is starting to be congested.

In block 1509, responsive to the flow control feedback being received that indicates the MAC flow is congested or is starting to be congested, the processing circuitry 803 decreases the number of MAC flow packets by a predetermined number or by an adaptively adjusted number.

Details of various embodiments of congestion flow control are described above in the section of cell-level inter-gNB flow control with QoS differentiation and fairness constraints In the description that follows, while the second network node may be any of the network node 800, the network node 4160, base stations 4412, the host computer 4430, and the base station 4520, the network node 800 shall be used to describe the functionality of the second network node. The network node 800 (implemented using the structure of the block diagram of FIG. 8) is configured to operate as a first network node will now be discussed with reference to the flow chart of FIG. 16 according to some embodiments of inventive concepts. For example, modules may be stored in memory 805 of FIG. 8, and these modules may provide instructions so that when the instructions of a module are executed by respective network node processing circuitry 803, processing circuitry 803 performs respective operations of the flow chart.

Turning to FIG. 16, the second network node 800 has one or more second carriers in communication with one or more first network nodes having one or more first carriers.

In block 1601, the processing circuitry 803 receives from the one or more first network nodes, an indication of Media Access Control, MAC flow packets comprising MAC sub-protocol data units, PDUs, from each of the one or more first network nodes. In block 1603, for each MAC flow, the processing circuitry 803 receives a quality of service (QoS) defined for the MAC flow.

In block 1605, the processing circuitry 803, based on receiving data in one or more MAC sub-PDUs and the QoS defined for one or more MAC flows, prioritizes data traffic amongst each of the one or more MAC flows and traffic local to the second network node. In some embodiments of inventive concepts, prioritizing data traffic amongst each of the one or more MAC flows and traffic local to the second network node includes using quality of service, QoS, differentiation defined for each MAC flow of the second network node to provide the prioritization of traffic among each of the at least one MAC flow and the traffic local to the second network node.

In some other embodiments of inventive concepts, receiving the indication of MAC flow packets from each of the one or more first network nodes includes the processing circuitry 803 for each MAC flow from a network node, receiving a quality of service, QoS, level defined for the MAC flow such that data from all UEs associated with the first network node of a defined QoS level are received at the second network node in a MAC flow corresponding to the defined QoS level. In some of these embodiments of inventive concepts. the processing circuitry 803 prioritizes data traffic amongst each of the one or more MAC flows and traffic local to the second network node by prioritizing the one or more MAC flows in accordance with the QoS levels defined.

Turning to FIG. 17, in some embodiments of inventive concepts, the processing circuitry 803 receives an indication of decoupling of primary cell, PCell and secondary cell, SCell, scheduling decisions by separating hybrid automatic repeat request, HARQ, feedback opportunity separately into virtual physical uplink control channel, PUCCH, groups, VPGs per network node and per UE in block 1701. This enables channel allocations by network schedulers to be decoupled from each other as described above.

In some embodiments of inventive concepts, the processing circuitry 803 receives, from the first network node, an indication of a VPG defined for the second network node, the indication including a mapping of a unique uplink, UL, slot for the second network node.

Turning to FIG. 18, in block 1801, the processing circuitry 803 receives, from the first network node, for each newly-active connection with traffic towards the VPG defined for the second network node, an indication of one or more PUCCH resources reserved for a network node scheduler associated with the second network node. This enables the network node scheduler to independently schedule resources.

In block 1803, the processing circuitry 803, for each of the one or more PUCCH resources reserved, the processing circuitry 803 receives a minimum payload and a maximum payload of HARQ-ACK uplink control information, UCI for the network node scheduler associated with the second network node.

In various other embodiments, the processing circuitry 803, for a slot k to which the VPG defined for the second network node is mapped, transmitting an indication of a number of allocated HARQ-ACK bits on the slot k to the first network node and an indication of a PUCCH resource selected at an end of slot k.

In yet other embodiments of inventive concepts, the processing circuitry 803 prioritizes any pending HARQ-retransmissions required for SCell traffic with respect to new transmission and re-transmissions.

As described above, the second network node considers the possible skew in over-the-air transmission of the subsequent bytes of RLC SDUs if a gNB and/or other SCell-gNBs would have transmitted subsequent bytes of RLC SDU at different over-the-air times. A part of such skew is attributed to the skew in the delay between the gNBs. The other skew is attributed to the difference in scheduling delay at each gNB, which is in turn related to the variation in the short-term traffic characteristics in each node.

Turing to FIG. 19, for skew control, the processing circuitry 803 in block 1901 employs a priority-boost for MAC-flow traffic when an age of an oldest MAC flow packet exceeds a defined threshold. In block 1903, the processing circuitry 803 adapts the defined threshold based on perceived inter-gNB delay, load conditions, and L2 buffering capabilities of a UE.

Turning to FIG. 20, to aid the first network node in congestion flow control, the processing circuitry 803 in block 2001 periodically transmits flow-control feedback for each SCell to a first network node associated with the SCell, the flow-control feedback including at least one of a number of MAC flow packets consumed, nSent, since a last feedback where consumed includes data scheduled for initial transmission, any data lost, expired and dropped, and a congestionIndication flag which indicates congestion at the SCell.

From the foregoing, it can be seen that in various embodiments of inventive concepts, virtual PUCCH groups have been described that separate HARQ-ACK feedback per gNB have been described, use of MAC sub-PDUs scaled to radio resource to provide channel-quality-neutral segments for flow-control and congestion control have been described, flow control supported per QoS grouping per SCELL carrier has been described, and delay-based QoS treatment to control RLC-data skew when simultaneously scheduling on multiple gNBs has been described.

Example embodiments are discussed below.

Draft Embodiments

Embodiment 1. A method performed by a first network node (800, 4160, 4412*a*, 4412*b*, 4412*c*, 4520) having one or more carriers in a network, the method comprising:

- defining (1001) a number of media access control, MAC, flows from the first network node that each forms a source end-point to a destination end-point, wherein the first network node comprises the source end-point and each destination end point comprises a second network node having one or more destination carriers;
- defining (1003) a MAC flow packet size that is scaled based on carrier bandwidth where each MAC flow packet has an approximately equivalent spectrum usage and an equivalent quality of service, QoS, on a destination carrier on the second network node; and
- transmitting (1005) a MAC flow packet to the second network node, wherein the MAC flow packet comprises a bundle of one or more MAC sub-protocol data units, sub-PDUs.

Embodiment 2. The method of Embodiment 1 wherein defining the MAC flow packet size comprises defining the Mac flow packet size as a percent of a channel bandwidth of the MAC flow.

Embodiment 3. The method of any of Embodiments 1-2, further comprising:

- decoupling (1101) primary cell, PCell and secondary cell, SCell scheduling decisions by separating hybrid automatic repeat request, HARQ, feedback opportunity separately into virtual physical uplink control channel, PUCCH, groups, VPGs per network node and per UE.

Embodiment 4. The method of Embodiment 3 wherein separating HARQ feedback opportunity separately into VPGs comprises:

- for each UE, defining (1201) one or more VPGs wherein each VPG is for all serving cells of a network node including one VPG associated with the first network node; and
- mapping (1203) each VPG per UE to a unique uplink, UL, slot.

Embodiment 5. The method of Embodiment 4 further comprising:

- for each newly-active connection with traffic towards a VPG-i, reserving (1301) one or more physical uplink control channel, PUCCH, resources;
- indicating (1303) the one or more PUCCH resources reserved to a network node scheduler associated with the VPG-i; and
- for each of the one or more PUCCH resources reserved, providing a minimum payload and a maximum payload of HARQ-ACK uplink control information, UCI to the network node scheduler associated with the VPG-i.

Embodiment 6. The method of any of Embodiments 1-5, further comprising:

for a slot k to which VPG-i is mapped, receiving (1401) an indication of a number of allocated HARQ-ACK bits on the slot k from a VPG-i node and an indication of a PUCCH resource selected at an end of slot k.

Embodiment 7. The method of Embodiment 6, further comprising:

responsive to receiving the number of allocated HARQ-ACK bits, setting up (1403) a PUCCH receiver or a physical uplink shared channel, PUSCH, receiver with a number of expected UCI bits for decoding allocated resources on the PUCCH or the PUSCH.

Embodiment 8. The method of Embodiment 6 wherein a delay between the VPG-i node sending the indication of the number of allocated HARQ-ACK bits and receiving the indication is a one-way inter-node delay, the method further comprising setting up a PUCCH receiver for PUCCH transmission including ensuring that $mink_1$ for VPG-i is greater than the one-way inter-node delay where $mink_1$ is a minimum value of allowed $k_1$ for VPG-i.

Embodiment 9. The method of any of Embodiments 1-8 further comprising defining the MAC flow packet size for UEi towards an SCell, wherein the MAC flow packet scales with UE-specific channel quality and a target number of physical resource blocks, PRBs, required based on a current estimation of channel state information, CSI.

Embodiment 10. The method of Embodiment 9 wherein defining the MAC flow packet size comprises defining the MAC flow packet size in accordance with $$MAC \text{ flow packet size} = \frac{ICC[i] \times N_{PRB}^{scell} \times n_{RE}}{B}$$

where ICC[i] is information carrying-capacity in units of bits per RE, $$N_{PRB}^{scell}$$

is a number of PRBs in the SCell, $n_{RE}$ is an approximate number of resource elements, REs, per PRB available for physical downlink shared channel, PDSCH; and B is a parameter that controls the target-fraction of the SCell bandwidth that is needed to fit one MAC flow packet.

Embodiment 11. The method of any of Embodiments 1-10, further comprising:

responsive to receiving data in at least one MAC flow, using quality of service, QoS, differentiation defined for each MAC flow to provide prioritization of traffic among each of the at least one MAC flow and local user traffic.

Embodiment 12. The method of any of Embodiments 1-11, wherein defining a number of MAC flows comprises defining a MAC flow for each quality of service, QoS level such that data from all UEs associated with the first network node of a defined QoS level are transported to a second network node having a destination SCell using a MAC flow corresponding to the defined QoS level.

Embodiment 13. The method of any of Embodiments 1-12, further comprising performing congestion control on each MAC flow independent of other MAC flows.

Embodiment 14. The method of Embodiment 13 wherein performing congestions control for a MAC flow comprises:

tracking (1501) a number of MAC flow packets transmitted to a SCell in the MAC flow;

receiving (1503) flow control feedback from the SCell;

responsive to the flow control feedback indicating no congestion has been detected, increasing (1505) the number of MAC flow packets transmitted to the SCell in the MAC flow by one of a predetermined step size or an adaptively adjusted step size;

continually increasing (1507) the number of MAC flow packets transmitted to the SCell until flow control feedback is received indicating the MAC flow is congested or is starting to be congested; and responsive to the flow control feedback being received that indicates the MAC flow is congested or is starting to be congested, decreasing (1509) the number of MAC flow packets by a predetermined number or by an adaptively adjusted number.

Embodiment 15. A first network node (800, 4160, 4412*a*, 4412*b*, 4412*c*, 4520) comprising:

processing circuitry (803, 4170, 4528); and memory (805) coupled with the processing circuitry, wherein the memory includes instructions that when executed by the processing circuitry causes the first network node to perform operations comprising:

defining (1001) a number of media access control, MAC, flows from the first network node that each forms a source end-point to a destination end-point, wherein the first network node comprises the source end-point and each destination end point comprises a second network node having one or more destination carriers;

defining (1003) a MAC flow packet size that is scaled based on carrier bandwidth where each MAC flow packet has an approximately equivalent spectrum usage and an equivalent quality of service, QoS, on a destination carrier on the second network node; and transmitting (1005) a MAC flow packet to the second network node, wherein the MAC flow packet comprises a bundle of one or more MAC sub-protocol data units, sub-PDUs.

Embodiment 16. The first network node (800, 4160, 4412*a*, 4412*b*, 4412*c*, 4520) of Embodiment 15 wherein in defining the MAC flow packet size, the memory includes instructions that when executed by the processing circuitry causes the first network node to perform operations comprising defining the Mac flow packet size as a percent of a channel bandwidth of the MAC flow.

Embodiment 17. The first network node (800, 4160, 4412*a*, 4412*b*, 4412*c*, 4520) of any of Embodiments 15-16, wherein the memory includes further instructions that when executed by the processing circuitry causes the first network node to perform operations further comprising:

decoupling (1101) primary cell, PCell and secondary cell, SCell scheduling decisions by separating hybrid automatic repeat request, HARQ, feedback opportunity separately into virtual physical uplink control channel, PUCCH, groups, VPGs per network node and per UE.

Embodiment 18. The first network node (800, 4160, 4412*a*, 4412*b*, 4412*c*, 4520) of Embodiment 17 wherein in separating HARQ feedback opportunity separately into VPGs, the memory includes instructions that when executed by the processing circuitry causes the first network node to perform operations comprising:

for each UE, defining (1201) one or more VPGs wherein each VPG is for all serving cells of a network node including one VPG associated with the first network node; and mapping (1203) each VPG per UE to a unique uplink, UL, slot.

Embodiment 19. The first network node (800, 4160, 4412*a*, 4412*b*, 4412*c*, 4520) of Embodiment 18, wherein the memory includes further instructions that when executed by the processing circuitry causes the first network node to perform operations further comprising:

for each newly-active connection with traffic towards a VPG-i, reserving (1301) one or more physical uplink control channel, PUCCH, resources;

indicating (1303) the one or more PUCCH resources reserved to a network node scheduler associated with the VPG-i; and for each of the one or more PUCCH resources reserved, providing a minimum payload and a maximum payload of HARQ-ACK uplink control information, UCI to the network node scheduler associated with the VPG-i.

Embodiment 20. The first network node (800, 4160, 4412*a*, 4412*b*, 4412*c*, 4520) of any of Embodiments 15-19, wherein the memory includes further instructions that when executed by the processing circuitry causes the first network node to perform operations further comprising:

for a slot k to which VPG-i is mapped, receiving (1401) an indication of a number of allocated HARQ-ACK bits on the slot k from a VPG-i node and an indication of a PUCCH resource selected at an end of slot k.

Embodiment 21. The first network node (800, 4160, 4412*a*, 4412*b*, 4412*c*, 4520) of Embodiment 20, wherein the memory includes further instructions that when executed by the processing circuitry causes the first network node to perform operations further comprising:

responsive to receiving the number of allocated HARQ-ACK bits, setting up (1403) a PUCCH receiver or a physical uplink shared channel, PUSCH, receiver with a number of expected UCI bits for decoding allocated resources on the PUCCH or the PUSCH.

Embodiment 22. The first network node (800, 4160, 4412*a*, 4412*b*, 4412*c*, 4520) of Embodiment 20 wherein a delay between the VPG-i node sending the indication of the number of allocated HARQ-ACK bits and receiving the indication is a one-way inter-node delay, wherein the memory includes further instructions that when executed by the processing circuitry causes the first network node to perform operations further comprising setting up a PUCCH receiver for PUCCH transmission including ensuring that $mink_1$ for VPG-i is greater than the one-way inter-node delay where $mink_1$ is a minimum value of allowed $k_1$ for VPG-i.

Embodiment 23. The first network node (800, 4160, 4412*a*, 4412*b*, 4412*c*, 4520) of any of Embodiments 15-22, wherein the memory includes further instructions that when executed by the processing circuitry causes the first network node to perform operations further comprising defining the MAC flow packet size for UEi towards an SCell, wherein the MAC flow packet scales with UE-specific channel quality and a target number of physical resource blocks, PRBs, required based on a current estimation of channel state information, CSI.

Embodiment 24. The first network node (800, 4160, 4412*a*, 4412*b*, 4412*c*, 4520) of Embodiment 23, wherein in defining the MAC flow packet size, the memory includes instructions that when executed by the processing circuitry causes the first network node to perform operations comprising defining the MAC flow packet size in accordance with $$MAC \text{ flow packet size} = \frac{ICC[i] \times N_{PRB}^{scell} \times n_{RE}}{B}$$

where ICC[i] is information carrying-capacity in units of bits per RE, $$N_{PRB}^{scell}$$

is a number of PRBs in the SCell, $n_{RE}$ is an approximate number of resource elements, REs, per PRB available for physical downlink shared channel, PDSCH; and B is a parameter that controls the target-fraction of the SCell bandwidth that is needed to fit one MAC flow packet.

Embodiment 25. The first network node (800, 4160, 4412*a*, 4412*b*, 4412*c*, 4520) of any of Embodiments 15-24, wherein the memory includes further instructions that when executed by the processing circuitry causes the first network node to perform operations further comprising:

responsive to receiving data in at least one MAC flow, using quality of service, QoS, differentiation defined for each MAC flow to provide prioritization of traffic among each of the at least one MAC flow and local user traffic.

Embodiment 26. The first network node (800, 4160, 4412*a*, 4412*b*, 4412*c*, 4520) of any of Embodiments 15-25, wherein in defining a number of MAC flows, the memory includes instructions that when executed by the processing circuitry causes the first network node to perform operations comprising defining a MAC flow for each quality of service, QoS level such that data from all UEs associated with the first network node of a defined QoS level are transported to a second network node having a destination SCell using a MAC flow corresponding to the defined QoS level.

Embodiment 27. The first network node (800, 4160, 4412*a*, 4412*b*, 4412*c*, 4520) of any of Embodiments 15-26, wherein the memory includes further instructions that when executed by the processing circuitry causes the first network node to perform operations further comprising performing congestion control on each MAC flow independent of other MAC flows.

Embodiment 28. The first network node (800, 4160, 4412*a*, 4412*b*, 4412*c*, 4520) of Embodiment 27 wherein in performing congestions control for a MAC flow, the memory includes instructions that when executed by the processing circuitry causes the first network node to perform operations comprising:

tracking (1501) a number of MAC flow packets transmitted to a SCell in the MAC flow;

receiving (1503) flow control feedback from the SCell;

responsive to the flow control feedback indicating no congestion has been detected, increasing (1505) the number of MAC flow packets transmitted to the SCell in the MAC flow by one of a predetermined step size or an adaptively adjusted step size;

continually increasing (1507) the number of MAC flow packets transmitted to the SCell until flow control feedback is received indicating the MAC flow is congested or is starting to be congested; and responsive to the flow control feedback being received that indicates the MAC flow is congested or is starting to be congested, decreasing (1509) the number of MAC flow packets by a predetermined number or by an adaptively adjusted number Embodiment 29. A first network node (800, 4160, 4412*a*, 4412*b*, 4412*c*, 4520) adapted to perform operations comprising:

defining (1001) a number of media access control, MAC, flows from the first network node that each forms a source end-point to a destination end-point, wherein the first network node comprises the source end-point and each destination end point comprises a second network node having one or more destination carriers;

defining (1003) a MAC flow packet size that is scaled based on carrier bandwidth where each MAC flow packet has an approximately equivalent spectrum usage and an equivalent quality of service, QoS, on a destination carrier on the second network node; and transmitting (1005) a MAC flow packet to the second network node, wherein the MAC flow packet comprises a bundle of one or more MAC sub-protocol data units, sub-PDUs.

Embodiment 30: The first network node (800, 4160, 4412*a*, 4412*b*, 4412*c*, 4520) of Embodiment 29, wherein the first network node is further adapted to perform operations according to any of Embodiments 2-14.

Embodiment 31. A computer program comprising program code to be executed by processing circuitry (803, 4170, 4528) of a first network node (800, 4160, 4412*a*, 4412*b*, 4412*c*, 4520), whereby execution of the program code causes the first network node (800, 4160, 4412*a*, 4412*b*, 4412*c*, 4520) to perform operations comprising:

defining (1001) a number of media access control, MAC, flows from the first network node that each forms a source end-point to a destination end-point, wherein the first network node comprises the source end-point and each destination end point comprises a second network node having one or more destination carriers;

defining (1003) a MAC flow packet size that is scaled based on carrier bandwidth where each MAC flow packet has an approximately equivalent spectrum usage and an equivalent quality of service, QoS, on a destination carrier on the second network node; and transmitting (1005) a MAC flow packet to the second network node, wherein the MAC flow packet comprises a bundle of one or more MAC sub-protocol data units, sub-PDUs.

Embodiment 32. The computer program of Embodiment 31, wherein the computer program comprises further program code whereby execution of the program code causes the first network node (800, 4160, 4412*a*, 4412*b*, 4412*c*, 4520) to perform operations according to any of Embodiments 2-14.

Embodiment 33. A computer program product comprising a non-transitory storage medium including program code to be executed by processing circuitry (803, 4170, 4528) of a first network node (800, 4160, 4412*a*, 4412*b*, 4412*c*, 4520), whereby execution of the program code causes the first network node (800, 4160, 4412*a*, 4412*b*, 4412*c*, 4520) to perform operations comprising:

defining (1001) a number of media access control, MAC, flows from the first network node that each forms a source end-point to a destination end-point, wherein the first network node comprises the source end-point and each destination end point comprises a second network node having one or more destination carriers;

defining (1003) a MAC flow packet size that is scaled based on carrier bandwidth where each MAC flow packet has an approximately equivalent spectrum usage and an equivalent quality of service, QoS, on a destination carrier on the second network node; and transmitting (1005) a MAC flow packet to the second network node, wherein the MAC flow packet comprises a bundle of one or more MAC sub-protocol data units, sub-PDUs.

Embodiment 34. The computer program of Embodiment 31, wherein the non-transitory storage medium includes further program code whereby execution of the further program code causes the first network node (800, 4160, 4412*a*, 4412*b*, 4412*c*, 4520) to perform operations according to any of Embodiments 2-14.

Embodiment 35. A method performed by a second network node (800, 4160, 4412*a*, 4412*b*, 4412*c*, 4520) having one or more second carriers in communication with one or more first network nodes having one or more first carriers, the method comprising:

receiving (1601), from the one or more first network nodes, an indication of Media Access Control, MAC flow packets comprising MAC sub-protocol data units, PDUs, from each of the one or more first network nodes;

for each MAC flow of one or more MAC flows, receiving (1603) a quality of service, QoS, defined for the MAC flow; and based on receiving data in one or more MAC sub-PDUs and the QoS defined for the one or more MAC flows, prioritizing (1605) data traffic amongst each of the one or more MAC flows and traffic local to the second network node.

Embodiment 36. The method of Embodiment 35, further comprising:

receiving (1701) an indication of decoupling of primary cell, PCell and secondary cell, SCell, scheduling decisions by separating hybrid automatic repeat request, HARQ, feedback opportunity separately into virtual physical uplink control channel, PUCCH, groups, VPGs per network node and per UE.

Embodiment 37. The method of Embodiment 36 wherein receiving the indication comprises:

receiving, from the first network node, an indication of a VPG defined for the second network node, the indication including a mapping of a unique uplink, UL, slot for the second network node.

Embodiment 38. The method of Embodiment 37 further comprising:

receiving (1801), from the first network node, for each newly-active connection with traffic towards the VPG defined for the second network node, an indication of one or more PUCCH resources reserved for a network node scheduler associated with the second network node; and for each of the one or more PUCCH resources reserved, receiving (1803) a minimum payload and a maximum payload of HARQ-ACK uplink control information, UCI for the network node scheduler associated with the second network node.

Embodiment 39. The method of any of Embodiments 35-38, further comprising:

for a slot k to which the VPG defined for the second network node is mapped, transmitting an indication of a number of allocated HARQ-ACK bits on the slot k to the first network node and an indication of a PUCCH resource selected at an end of slot k.

Embodiment 40. The method of any of Embodiments 35-39, wherein prioritizing data traffic amongst each of the one or more MAC flows and traffic local to the second network node comprises:

using quality of service, QoS, differentiation defined for each MAC flow of the second network node to provide the prioritization of traffic among each of the at least one MAC flow and the traffic local to the second network node.

Embodiment 41. The method of any of Embodiments 35-40, wherein receiving the indication of MAC flow packets from each of the one or more first network nodes comprises:

for each MAC flow from a network node, receiving a quality of service, QoS, level defined for the MAC flow such that data from all UEs associated with the first network node of a defined QoS level are received at the second network node in a MAC flow corresponding to the defined QoS level.

Embodiment 42. The method of Embodiment 41, wherein prioritizing data traffic amongst each of the one or more MAC flows and traffic local to the second network node comprises prioritizing the one or more MAC flows in accordance with the QoS levels defined.

Embodiment 43. The method of any of Embodiments 35-42, further comprising:

for each UE and towards a given SCell, when prioritized, performing PDSCH link adaptation and creating a MAC PDU transport block by multiplexing one or multiple of the MAC flow packets in-sequence and without segmenting the MAC-flow packets.

Embodiment 44. The method of any of Embodiments 35-43, further comprising:

prioritizing any pending HARQ-retransmissions required for SCell traffic with respect to new transmission and re-transmissions.

Embodiment 45. The method of any of Embodiments 35-44, further comprising:

employing (1901) a priority-boost for MAC-flow traffic when an age of an oldest MAC flow packet exceeds a defined threshold.

Embodiment 46. The method of Embodiment 45, further comprising adapting (1903) the defined threshold based on perceived inter-gNB delay, load conditions, and L2 buffering capabilities of a UE.

Embodiment 47. The method of any of Embodiments 35-46, further comprising:

periodically transmitting (2001) flow-control feedback for each SCell to a first network node associated with the SCell, the flow-control feedback including at least one of a number of MAC flow packets consumed, nSent, since a last feedback where consumed includes data scheduled for initial transmission, any data lost, expired and dropped, and a congestionIndication flag which indicates congestion at the SCell.

Embodiment 48. A second network node (800, 4160, 4412*a*, 4412*b*, 4412*c*, 4520) comprising:

processing circuitry (803, 4170, 4528); and memory (805) coupled with the processing circuitry, wherein the memory includes instructions that when executed by the processing circuitry causes the second network node (800, 4160, 4412*a*, 4412*b*, 4412*c*, 4520) to perform operations comprising:

receiving (1601), from the one or more first network nodes, an indication of Media Access Control, MAC flow packets comprising MAC sub-protocol data units, PDUs, from each of the one or more first network nodes;

for each MAC flow of one or more MAC flows, receiving (1603) a quality of service, QoS, defined for the MAC flow; and based on receiving data in one or more MAC sub-PDUs and the QoS defined for the one or more MAC flows, prioritizing (1605) data traffic amongst each of the one or more MAC flows and traffic local to the second network node.

Embodiment 49. The second network node (800, 4160, 4412*a*, 4412*b*, 4412*c*, 4520) of Embodiment 48, wherein the memory includes further instructions that when executed by the processing circuitry causes the second network node (800, 4160, 4412*a*, 4412*b*, 4412*c*, 4520) to perform operations further comprising:

receiving (1701) an indication of decoupling of primary cell, PCell and secondary cell, SCell, scheduling decisions by separating hybrid automatic repeat request, HARQ, feedback opportunity separately into virtual physical uplink control channel, PUCCH, groups, VPGs per network node and per UE.

Embodiment 50. The second network node (800, 4160, 4412*a*, 4412*b*, 4412*c*, 4520) of Embodiment 49 wherein in receiving the indication, the memory includes instructions that when executed by the processing circuitry causes the second network node (800, 4160, 4412*a*, 4412*b*, 4412*c*, 4520) to perform operations comprising:

receiving, from the first network node, an indication of a VPG defined for the second network node, the indication including a mapping of a unique uplink, UL, slot for the second network node.

Embodiment 51. The second network node (800, 4160, 4412*a*, 4412*b*, 4412*c*, 4520) of Embodiment 50, wherein the memory includes further instructions that when executed by the processing circuitry causes the second network node (800, 4160, 4412*a*, 4412*b*, 4412*c*, 4520) to perform operations further comprising:

receiving (1801), from the first network node, for each newly-active connection with traffic towards the VPG defined for the second network node, an indication of one or more PUCCH resources reserved for a network node scheduler associated with the second network node; and for each of the one or more PUCCH resources reserved, receiving (1803) a minimum payload and a maximum payload of HARQ-ACK uplink control information, UCI for the network node scheduler associated with the second network node.

Embodiment 52. The second network node (800, 4160, 4412*a*, 4412*b*, 4412*c*, 4520) of any of Embodiments 48-51, wherein the memory includes further instructions that when executed by the processing circuitry causes the second network node (800, 4160, 4412*a*, 4412*b*, 4412*c*, 4520) to perform operations further comprising:

for a slot k to which the VPG defined for the second network node is mapped, transmitting an indication of a number of allocated HARQ-ACK bits on the slot k to the first network node and an indication of a PUCCH resource selected at an end of slot k.

Embodiment 53. The second network node (800, 4160, 4412*a*, 4412*b*, 4412*c*, 4520) of any of Embodiments 48-52, wherein in prioritizing data traffic amongst each of the one or more MAC flows and traffic local to the second network node, the memory includes instructions that when executed by the processing circuitry causes the second network node (800, 4160, 4412*a*, 4412*b*, 4412*c*, 4520) to perform operations comprising:

using quality of service, QoS, differentiation defined for each MAC flow of the second network node to provide the prioritization of traffic among each of the at least one MAC flow and the traffic local to the second network node.

Embodiment 54. The second network node (800, 4160, 4412*a*, 4412*b*, 4412*c*, 4520) of any of Embodiments 48-53, wherein in receiving the indication of MAC flow packets from each of the one or more first network nodes, the memory includes instructions that when executed by the processing circuitry causes the second network node (800, 4160, 4412*a*, 4412*b*, 4412*c*, 4520) to perform operations comprising:

for each MAC flow from a network node, receiving a quality of service, QoS, level defined for the MAC flow such that data from all UEs associated with the first network node of a defined QoS level are received at the second network node in a MAC flow corresponding to the defined QoS level.

Embodiment 55. The second network node (800, 4160, 4412*a*, 4412*b*, 4412*c*, 4520) of Embodiment 54, wherein in prioritizing data traffic amongst each of the one or more MAC flows and traffic local to the second network node, the memory includes instructions that when executed by the processing circuitry causes the second network node (800, 4160, 4412*a*, 4412*b*, 4412*c*, 4520) to perform operations comprising prioritizing the one or more MAC flows in accordance with the QoS levels defined.

Embodiment 56. The second network node (800, 4160, 4412*a*, 4412*b*, 4412*c*, 4520) of any of Embodiments 48-55, wherein the memory includes further instructions that when executed by the processing circuitry causes the second network node (800, 4160, 4412*a*, 4412*b*, 4412*c*, 4520) to perform operations further comprising:

for each UE and towards a given SCell, when prioritized, performing PDSCH link adaptation and creating a MAC PDU transport block by multiplexing one or multiple of the MAC flow packets in-sequence and without segmenting the MAC-flow packets.

Embodiment 57. The second network node (800, 4160, 4412*a*, 4412*b*, 4412*c*, 4520) of any of Embodiments 48-56, wherein the memory includes further instructions that when executed by the processing circuitry causes the second network node (800, 4160, 4412*a*, 4412*b*, 4412*c*, 4520) to perform operations further comprising:

prioritizing any pending HARQ-retransmissions required for SCell traffic with respect to new transmission and re-transmissions.

Embodiment 58. The second network node (800, 4160, 4412*a*, 4412*b*, 4412*c*, 4520) of any of Embodiments 48-57, wherein the memory includes further instructions that when executed by the processing circuitry causes the second network node (800, 4160, 4412*a*, 4412*b*, 4412*c*, 4520) to perform operations further comprising:

employing (1901) a priority-boost for MAC-flow traffic when an age of an oldest MAC flow packet exceeds a defined threshold.

Embodiment 59. The second network node (800, 4160, 4412*a*, 4412*b*, 4412*c*, 4520) of Embodiment 58, wherein the memory includes further instructions that when executed by the processing circuitry causes the second network node (800, 4160, 4412*a*, 4412*b*, 4412*c*, 4520) to perform operations further comprising:

adapting (1903) the defined threshold based on perceived inter-gNB delay, load conditions, and L2 buffering capabilities of a UE.

Embodiment 60. The second network node (800, 4160, 4412*a*, 4412*b*, 4412*c*, 4520) of any of Embodiments 48-59, wherein the memory includes further instructions that when executed by the processing circuitry causes the second network node (800, 4160, 4412*a*, 4412*b*, 4412*c*, 4520) to perform operations further comprising:

periodically transmitting (2001) flow-control feedback for each SCell to a first network node associated with the SCell, the flow-control feedback including at least one of a number of MAC flow packets consumed, nSent, since a last feedback where consumed includes data scheduled for initial transmission, any data lost, expired and dropped, and a congestionIndication flag which indicates congestion at the SCell.

Embodiment 61. A second network node (800, 4160, 4412*a*, 4412*b*, 4412*c*, 4520) adapted to perform operations comprising:

receiving (1601), from the one or more first network nodes, an indication of Media Access Control, MAC flow packets comprising MAC sub-protocol data units, PDUs, from each of the one or more first network nodes;

for each MAC flow, receiving (1603) a quality of service, QoS, defined for the MAC flow; and based on receiving data in one or more MAC sub-PDUs and the QoS defined for one or more MAC flows, prioritizing (1605) data traffic amongst each of the one or more MAC flows and traffic local to the second network node.

Embodiment 62: The second network node (800, 4160, 4412*a*, 4412*b*, 4412*c*, 4520) of Embodiment 61, wherein the second network node (800, 4160, 4412*a*, 4412*b*, 4412*c*, 4520) is further adapted to perform operations according to any of Embodiments 35-47.

Embodiment 63. A computer program comprising program code to be executed by processing circuitry (803, 4170, 4528) of a second network node (800, 4160, 4412*a*, 4412*b*, 4412*c*, 4520), whereby execution of the program code causes the second network node (800, 4160, 4412*a*, 4412*b*, 4412*c*, 4520) to perform operations comprising:

receiving (1601), from the one or more first network nodes, an indication of Media Access Control, MAC flow packets comprising MAC sub-protocol data units, PDUs, from each of the one or more first network nodes;

for each MAC flow, receiving (1603) a quality of service, QoS, defined for the MAC flow; and based on receiving data in one or more MAC sub-PDUs and the QoS defined for one or more MAC flows, prioritizing (1605) data traffic amongst each of the one or more MAC flows and traffic local to the second network node.

Embodiment 64. The computer program of Embodiment 63, wherein the computer program contains further program code, whereby execution of the further program code causes the second network node (800, 4160, 4412*a*, 4412*b*, 4412*c*, 4520) to perform operations according to any of Embodiments 35-47.

Embodiment 65. A computer program product comprising a non-transitory storage medium including program code to be executed by processing circuitry (803, 4170, 4528) of a second network node (800, 4160, 4412*a*, 4412*b*, 4412*c*, 4520), whereby execution of the program code causes the second network node (800, 4160, 4412*a*, 4412*b*, 4412*c*, 4520) to perform operations comprising:

receiving (1601), from the one or more first network nodes, an indication of Media Access Control, MAC flow packets comprising MAC sub-protocol data units, PDUs, from each of the one or more first network nodes;

for each MAC flow, receiving (1603) a quality of service, QoS, defined for the MAC flow; and based on receiving data in one or more MAC sub-PDUs and the QoS defined for one or more MAC flows, prioritizing (1605) data traffic amongst each of the one or more MAC flows and traffic local to the second network node.

Embodiment 66. The computer program of Embodiment 65, wherein the non-transitory storage medium includes further program code, whereby execution of the further program code causes the second network node (800, 4160, 4412*a*, 4412*b*, 4412*c*, 4520) to perform operations according to any of Embodiments 35-47.

Explanations are provided below for various abbreviations/acronyms used in the present disclosure.

| Abbreviation | Explanation |
|---|---|
| DC | Dual Connectivity |
| CA | Carrier Aggregation |
| PDCCH | Physical Downlink Control Channel |
| PDSCH | Physical Downlink Shared Channel |
| PUCCH | Physical Uplink Control Channel |
| PUSCH | Physical Uplink Shared Channel |
| DCI | Downlink Control Information |
| UCI | Uplink Control Information |
| MAC | Medium Access Control |
| RLC | Radio Link Control |
| VPG | Virtual PUCCH group |
| PCell | Primary Cell |
| SCell | Secondary Cell |
| PDU | Protocol data unit |
| SDU | Service data unit |

References are identified below.

3GPP TS 38.321, V16.2.1 (2020-09): 3rd Generation Partnership Project; Technical Specification Group Radio Access Network; NR; Medium Access Control (MAC) protocol specification (Release 16)

3GPP TS 38.211, V16.3.0 (2020-09): 3rd Generation Partnership Project; Technical Specification Group Radio Access Network; NR; Physical Channels and Modulation (Release 16)

3GPP TS 38.212, V16.3.0 (2020-09): 3rd Generation Partnership Project; Technical Specification Group Radio Access Network; NR; Multiplexing and Channel Coding (Release 16)

3GPP TS 38.213 V16.3.0 (2020-09): 3rd Generation Partnership Project; Technical Specification Group Radio Access Network; NR; Physical layer procedures for control (Release 16) Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 21 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 21 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 22:
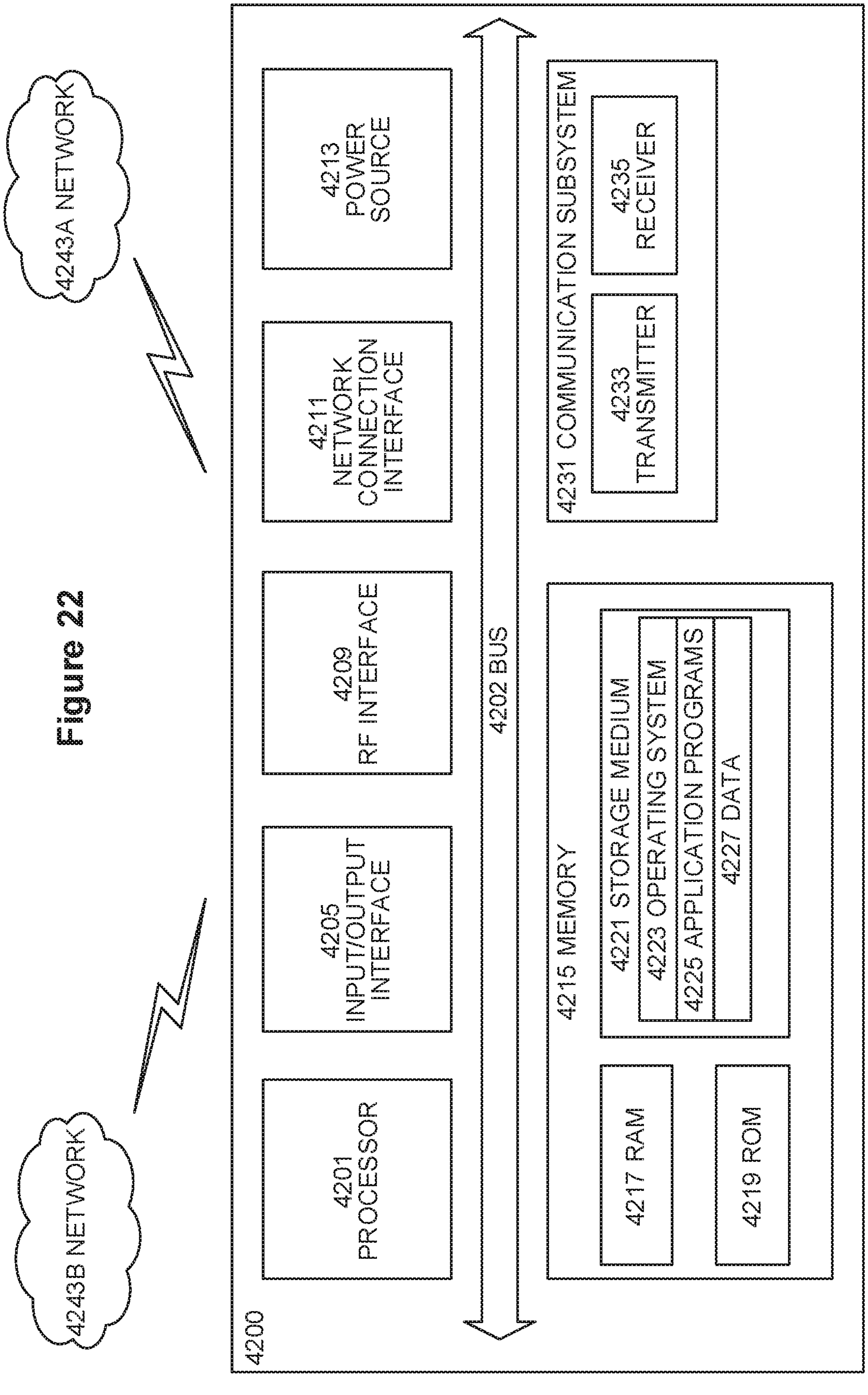
FIG. 22 is a block diagram of a user equipment in accordance with some embodiments

FIG. 22 illustrates a user Equipment in accordance with some embodiments.

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 22, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 22, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 23:
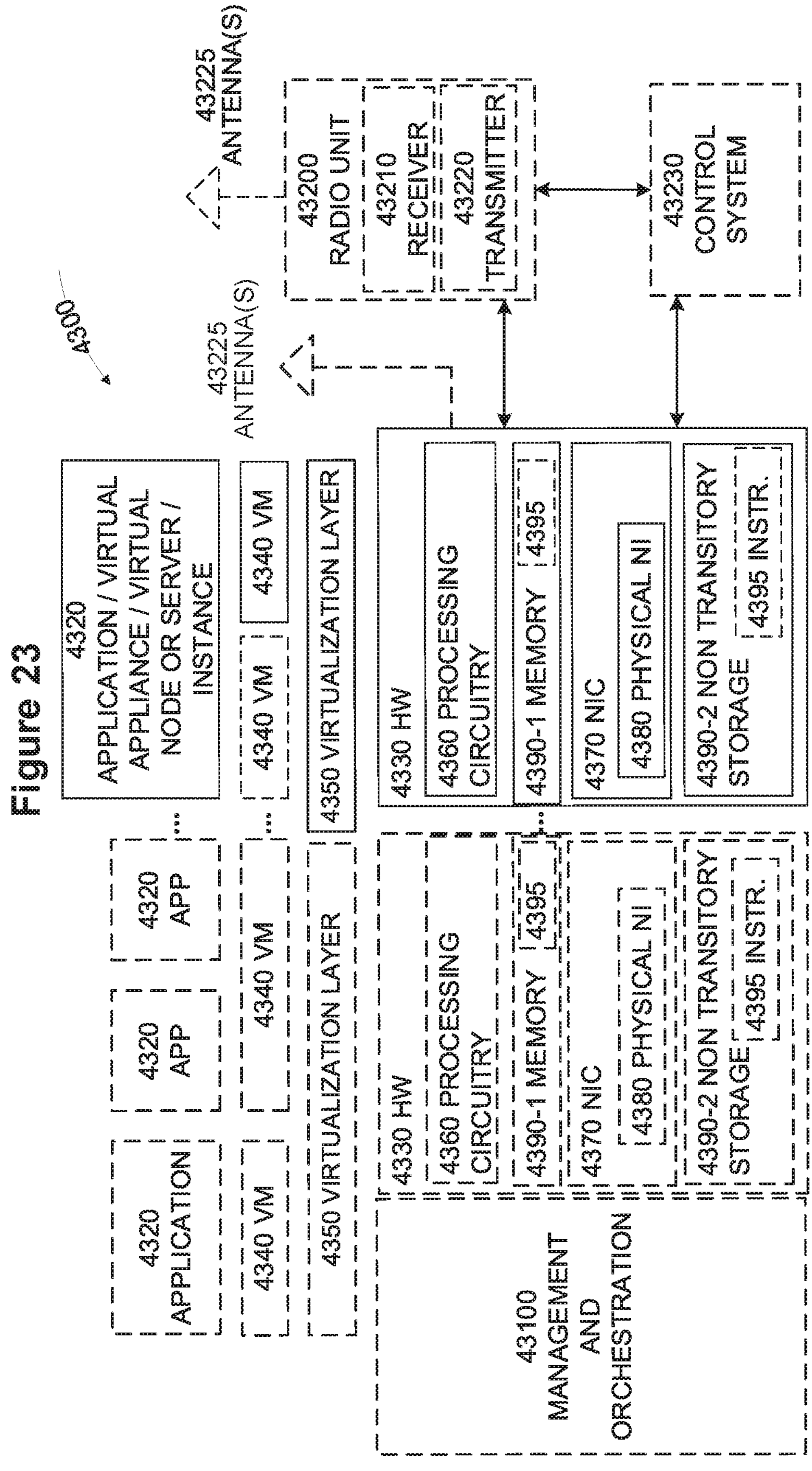
FIG. 23 is a block diagram of a virtualization environment in accordance with some embodiments.

FIG. 23 illustrates a virtualization environment in accordance with some embodiments.

FIG. 23 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 23, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 23.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 24:
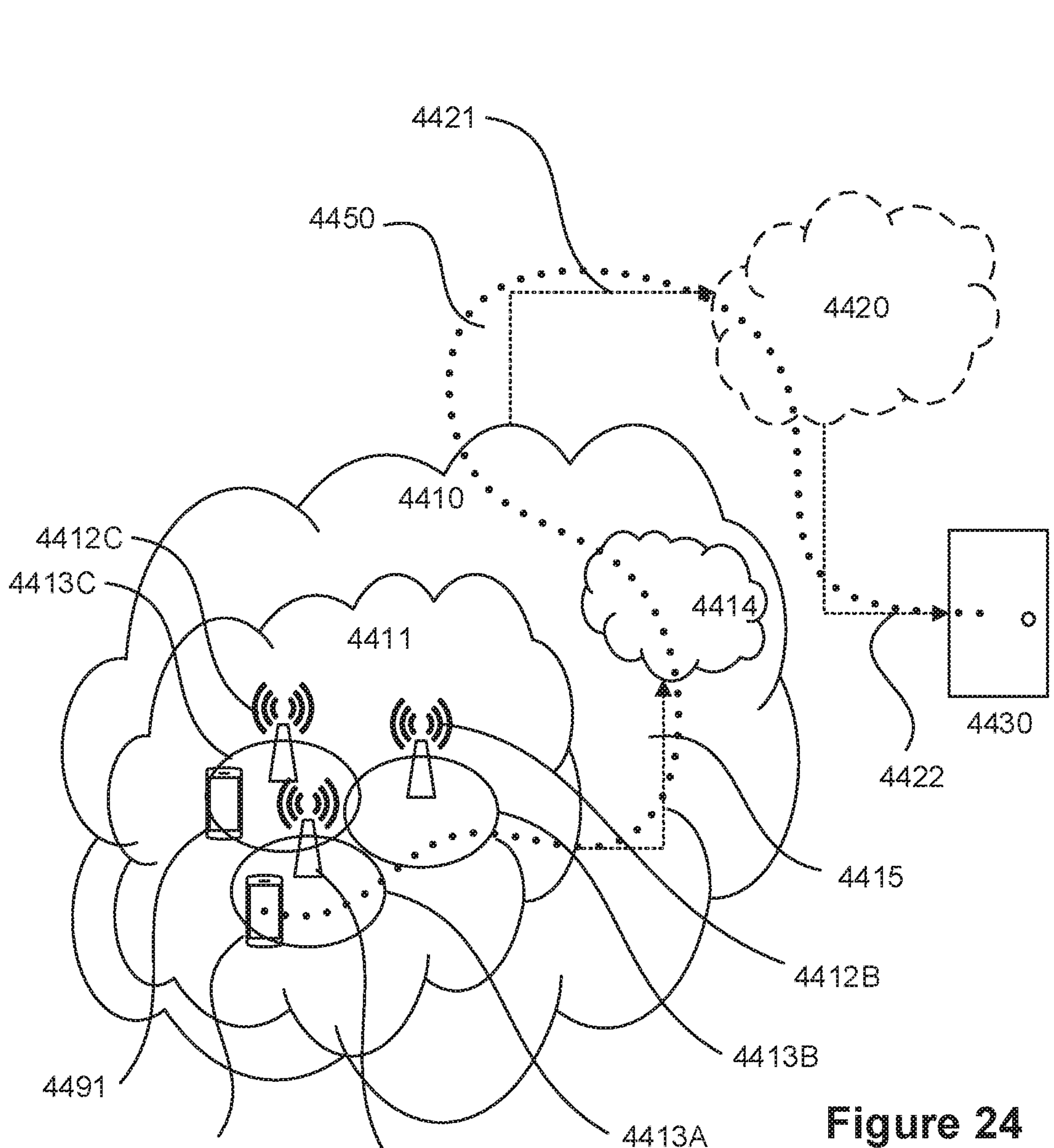
FIG. 24 is a block diagram of a telecommunication network connected via an intermediate network to a host computer in accordance with some embodiments.

FIG. 24 illustrates a telecommunication network connected via an intermediate network to a host computer in accordance with some embodiments.

With reference to FIG. 24, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 24 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 25:
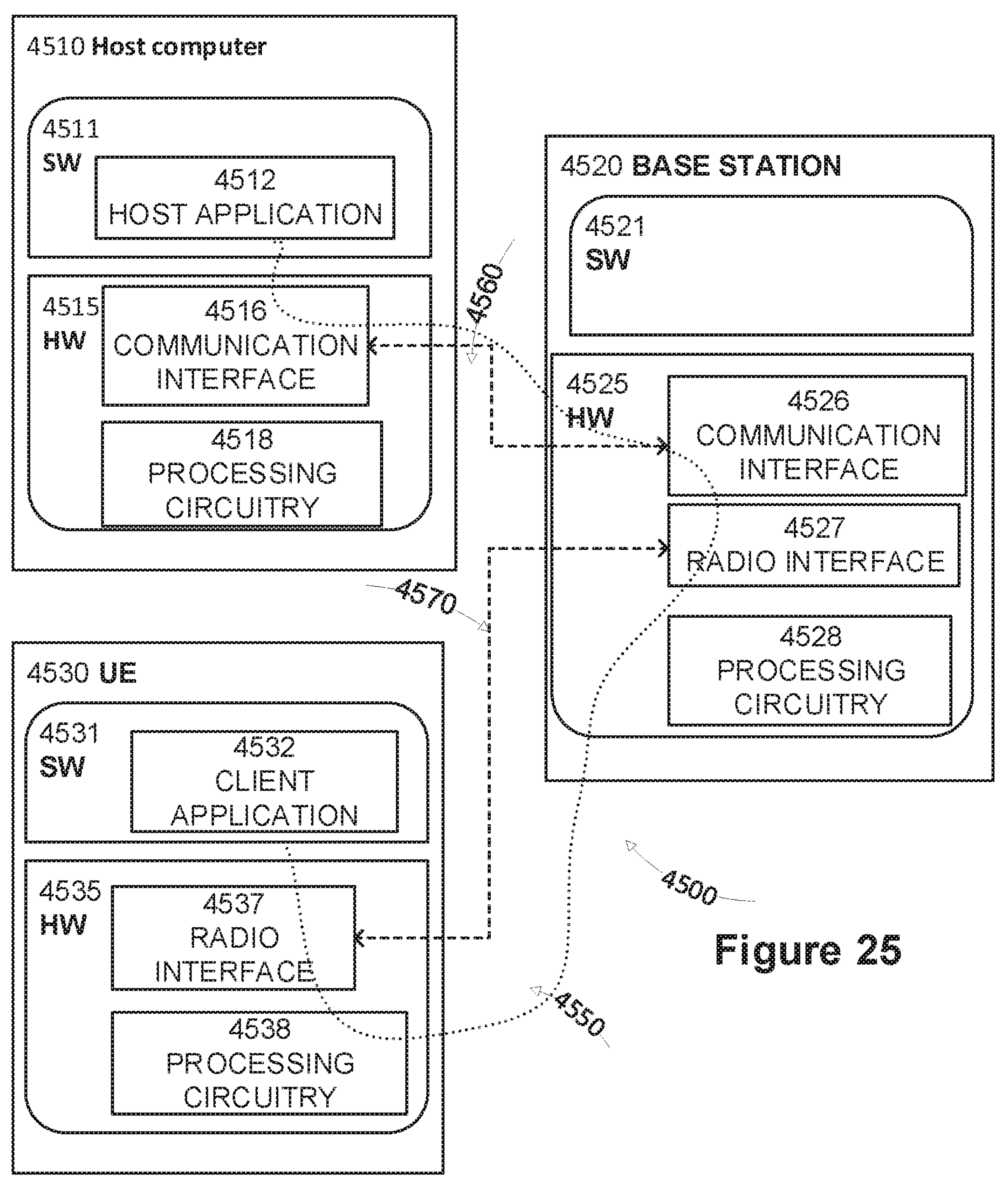
FIG. 25 is a block diagram of a host computer communicating via a base station with a user equipment over a partially wireless connection in accordance with some embodiments.

FIG. 25 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 25. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 25) served by base station 4520. Communication interface 4526 may be configured to facilitate connection 4560 to host computer 4510. Connection 4560 may be direct or it may pass through a core network (not shown in FIG. 25) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 25 may be similar or identical to host computer 4430, one of base stations 4412*a*, 4412*b*, 4412*c* and one of UEs 4491, 4492 of FIG. 24, respectively. This is to say, the inner workings of these entities may be as shown in FIG. 25 and independently, the surrounding network topology may be that of FIG. 24.

In FIG. 25, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figures 26, 27:
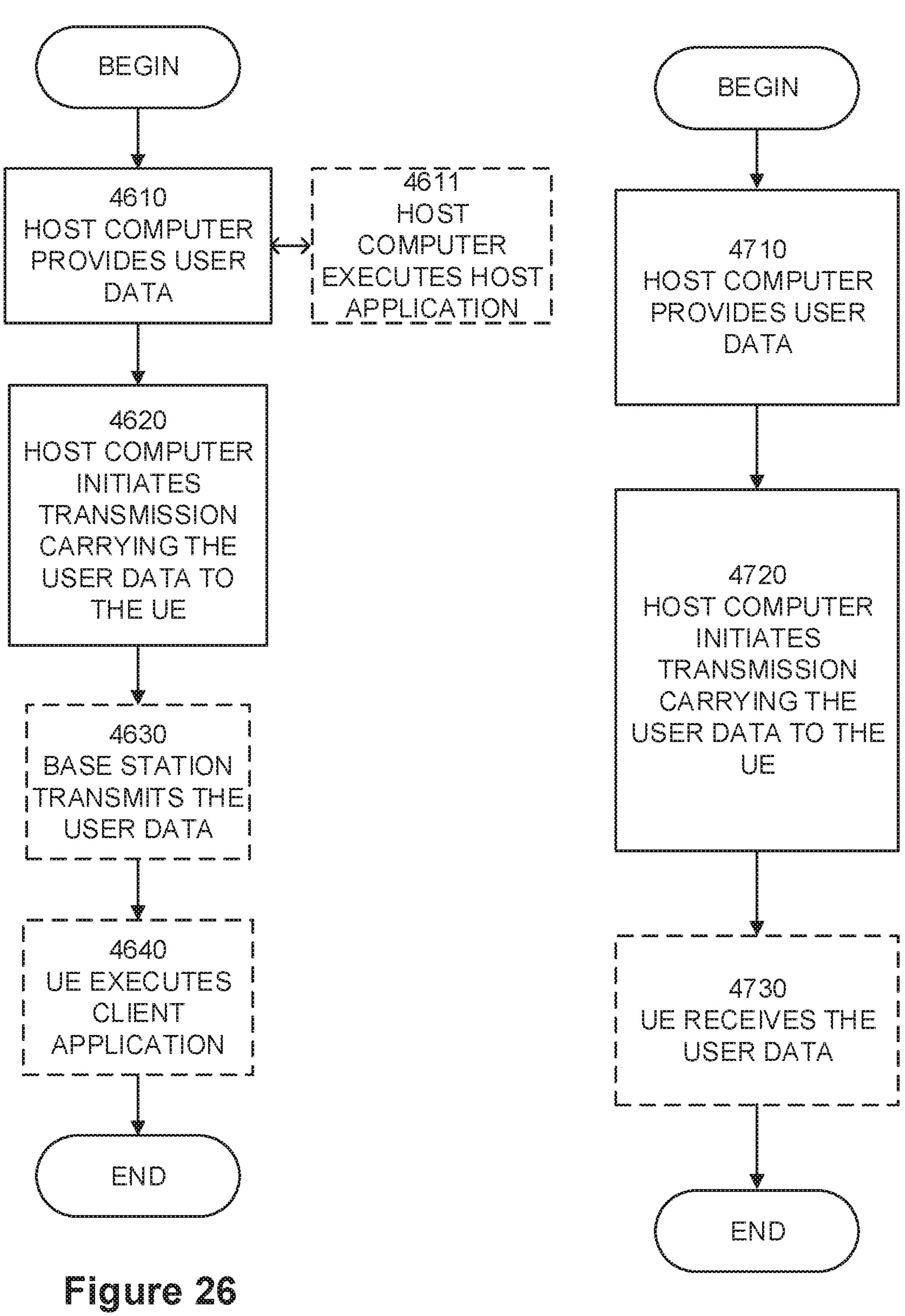
FIG. 26 is a block diagram of methods implemented in a communication system including a host computer, a base station and a user equipment in accordance with some embodiments.
FIG. 27 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 26 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

FIG. 27 illustrates methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 27 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figures 28, 29:
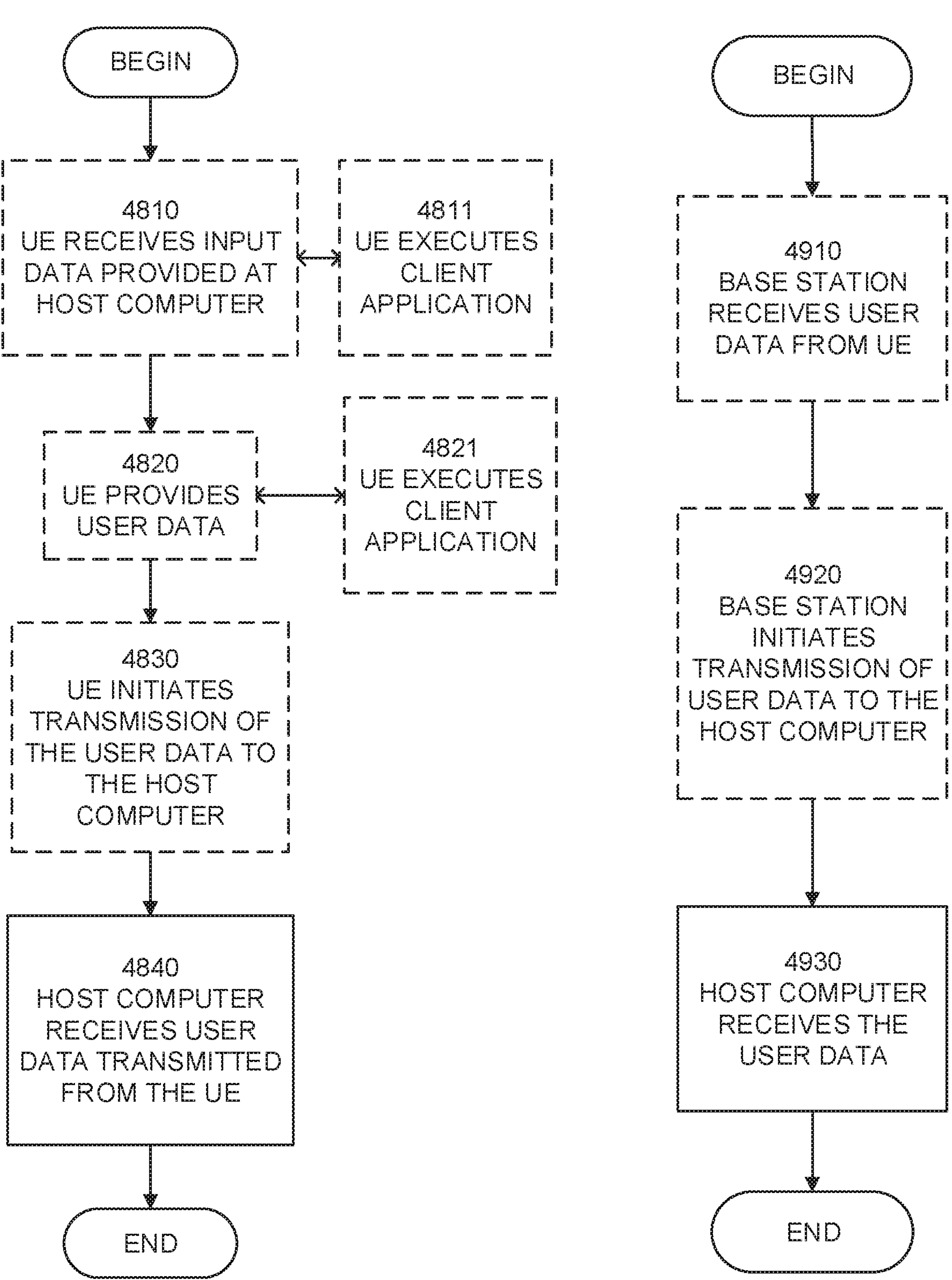
FIG. 28 is a block diagram of methods implemented in a communication system including a host computer, a base station and a user equipment in accordance with some embodiments.
FIG. 29 is a block diagram of methods implemented in a communication system including a host computer, a base station and a user equipment in accordance with some embodiments.

FIG. 28 illustrates methods implemented in a communication system including a host computer, a base station and a user equipment in accordance with some embodiments FIG. 28 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 28 will be included in this section. In step 4810 (which may be optional), the UE receives input data provided by the host computer. Additionally or alternatively, in step 4820, the UE provides user data. In substep 4821 (which may be optional)

of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

FIG. 29 illustrates methods implemented in a communication system including a host computer, a base station and a user equipment in accordance with some embodiments FIG. 29 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 29 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a first network node comprising a primary cell gNodeB (PCell-gNB) having one or more carriers in a network, the method comprising:

defining a number of media access control (MAC) flows from the first network node that each forms a source end-point to a destination end-point, wherein the first network node comprises the source end-point and each destination end point comprises a second network node comprising a secondary cell gNB (SCell-gNB) having one or more destination carriers;

defining a MAC flow packet size that is scaled based on carrier bandwidth where each MAC flow packet has an approximately equivalent spectrum usage and an equivalent quality of service (QoS) on a destination carrier on the second network node; and transmitting a MAC flow packet to the second network node, wherein the MAC flow packet comprises a bundle of one or more MAC sub-protocol data units (sub-PDUs).

2. The method of claim 1 wherein defining the MAC flow packet size comprises defining the MAC flow packet size as a percent of a channel bandwidth of the MAC flow.

3. The method of claim 1, further comprising:

decoupling PCell and SCell scheduling decisions by separating hybrid automatic repeat request (HARQ) feedback opportunity separately into virtual physical uplink control channel (PUCCH) groups (VPGs) per network node and per User Equipment (UE).

4. The method of claim 3 wherein separating HARQ feedback opportunity separately into VPGs comprises:

for each UE, defining one or more VPGs wherein each VPG is for all serving cells of a network node including one VPG associated with the first network node; and mapping each VPG per UE to a unique uplink (UL) slot.

5. The method of claim 4 further comprising:

for each newly-active connection with traffic towards a VPG-i, reserving one or more physical uplink control channel (PUCCH) resources;

indicating the one or more PUCCH resources reserved to a network node scheduler associated with the VPG-i; and for each of the one or more PUCCH resources reserved, providing a minimum payload and a maximum payload of hybrid automatic repeat request acknowledgement (HARQ-ACK) uplink control information (UCI) to the network node scheduler associated with the VPG-i.

6. The method of claim 1, further comprising:

for a slot k to which virtual physical uplink control channel (PUCCH) group VPG-i is mapped, receiving an indication of a number of allocated hybrid automatic repeat request acknowledgement HARQ-ACK bits on the slot k from a VPG-i node and an indication of a PUCCH resource selected at an end of slot k.

7. The method of claim 6, further comprising:

responsive to receiving the number of allocated HARQ-ACK bits, setting up a PUCCH receiver or a physical uplink shared channel (PUSCH) receiver with a number of expected uplink control information (UCI) bits for decoding allocated resources on the PUCCH or the PUSCH.

8. The method of claim 6 wherein a delay between the VPG-i node sending the indication of the number of allocated HARQ-ACK bits and receiving the indication is a one-way inter-node delay, the method further comprising setting up a PUCCH receiver for PUCCH transmission including ensuring that $mink_1$ for VPG-i is greater than the one-way inter-node delay where $mink_1$ is a minimum value of allowed $k_1$ for VPG-i.

9. The method of claim 1 further comprising defining the MAC flow packet size for user equipment (UE) towards an SCell, wherein the MAC flow packet scales with UE-specific channel quality and a target number of physical resource blocks (PRBs) required based on a current estimation of channel state information (CSI).

10. The method of claim 9 wherein defining the MAC flow packet size comprises defining the MAC flow packet size in accordance with $$MAC\text{ flow packet size} = \frac{ICC[i] \times N_{PRB}^{scell} \times n_{RE}}{B}$$

where ICC[i] is information carrying-capacity in units of bits per resource element (RE), $$N_{PRB}^{scell}$$

is a number of PRBs in the SCell, $n_{RE}$ is an approximate number of Res per PRB available for physical downlink shared channel (PDSCH); and B is a parameter that controls the target-fraction of the SCell bandwidth that is needed to fit one MAC flow packet.

11. The method of claim 1, further comprising:

responsive to receiving data in at least one MAC flow, using quality of service (QoS) differentiation defined for each MAC flow to provide prioritization of traffic among each of the at least one MAC flow and local user traffic.

12. The method of claim 1, wherein defining a number of MAC flows comprises defining a MAC flow for each quality of service (QoS) level such that data from all user equipments (UEs) associated with the first network node of a defined QoS level are transported to a second network node having a destination SCell using a MAC flow corresponding to the defined QoS level.

13. The method of claim 1, further comprising performing congestion control on each MAC flow independent of other MAC flows.

14. The method of claim 13 wherein performing congestions control for a MAC flow comprises:

tracking a number of MAC flow packets transmitted to a SCell in the MAC flow;

receiving flow control feedback from the SCell;

responsive to the flow control feedback indicating no congestion has been detected, increasing the number of MAC flow packets transmitted to the SCell in the MAC flow by one of a predetermined step size or an adaptively adjusted step size;

continually increasing the number of MAC flow packets transmitted to the SCell until flow control feedback is received indicating the MAC flow is congested or is starting to be congested; and responsive to the flow control feedback being received that indicates the MAC flow is congested or is starting to be congested, decreasing the number of MAC flow packets by a predetermined number or by an adaptively adjusted number.

15. A first network node comprising a primary cell gNodeB (PCell-gNB), the first network node comprising:

processing circuitry; and memory coupled with the processing circuitry, wherein the memory includes instructions that when executed by the processing circuitry causes the processing circuitry to perform operations comprising:

defining a number of media access control flows from the first network node that each forms a source end-point to a destination end-point, wherein the first network node comprises the source end-point and each destination end point comprises a second network node comprising a secondary cell gNB (SCell-gNB) having one or more destination carriers;

defining a MAC flow packet size that is scaled based on carrier bandwidth where each MAC flow packet has an approximately equivalent spectrum usage and an equivalent quality of service (QoS) on a destination carrier on the second network node; and transmitting a MAC flow packet to the second network node, wherein the MAC flow packet comprises a bundle of one or more MAC sub-protocol data units (sub-PDUs).

* * * * *